(12) United States Patent
Speed et al.

(10) Patent No.: US 11,923,544 B2
(45) Date of Patent: Mar. 5, 2024

(54) SURFACE MODIFICATION

(71) Applicant: Nexeon Limited, Abingdon (GB)

(72) Inventors: Jonathon David Speed, Reading (GB); Scott Brown, Cambridge (GB); Simon Foxon, Abingdon (GB)

(73) Assignee: Nexeon Limited, Abingdon (GB)

( * ) Notice: Subject to any disclaimer, the term of this patent is extended or adjusted under 35 U.S.C. 154(b) by 0 days.

(21) Appl. No.: 17/749,932

(22) Filed: May 20, 2022

(65) Prior Publication Data

US 2022/0278329 A1    Sep. 1, 2022

Related U.S. Application Data

(62) Division of application No. 15/777,104, filed as application No. PCT/GB2016/053594 on Nov. 17, 2016, now Pat. No. 11,342,558.

(30) Foreign Application Priority Data

Nov. 17, 2015    (GB) ...................................... 1520276

(51) Int. Cl.
| | |
|---|---|
| *H01M 4/60* | (2006.01) |
| *H01M 4/02* | (2006.01) |
| *H01M 4/36* | (2006.01) |
| *H01M 4/38* | (2006.01) |
| *H01M 4/587* | (2010.01) |
| *H01M 4/62* | (2006.01) |
| *H01M 10/052* | (2010.01) |
| *H01M 10/0525* | (2010.01) |
| *H01M 10/054* | (2010.01) |

(52) U.S. Cl.
CPC .............. *H01M 4/60* (2013.01); *H01M 4/366* (2013.01); *H01M 4/38* (2013.01); *H01M 4/386* (2013.01); *H01M 4/587* (2013.01); *H01M 4/62* (2013.01); *H01M 10/052* (2013.01); *H01M 10/0525* (2013.01); *H01M 10/054* (2013.01); *H01M 2004/027* (2013.01); *H01M 4/362* (2013.01)

(58) Field of Classification Search
None
See application file for complete search history.

(56)    References Cited

U.S. PATENT DOCUMENTS

| 9,252,421 B1 | 2/2016 | Erickson |
| 10,847,790 B2 | 11/2020 | Speed |
| 11,342,558 B2 | 5/2022 | Speed |

(Continued)

FOREIGN PATENT DOCUMENTS

| GB | 2532501 | 5/2016 |
| JP | H11 126608 | 5/1999 |

(Continued)

OTHER PUBLICATIONS

Uskokovic et al., "PEGylated silicon nanowire coated silica microparticles for drug delivery across intestinal epithelium," Biomaterials, Elsevier Science Publishers BV., Barking, GB, vol. 33, No. 5, Nov. 8, 2011, pp. 1663-1672.

(Continued)

*Primary Examiner* — Eli S Mekhlin
(74) *Attorney, Agent, or Firm* — McDonnell Boehnen Hulbert & Berghoff LLP

(57)    ABSTRACT

An electrochemically active material comprising a surface is provided, wherein the surface comprises an oligomer. A method of functionalising the surface with the oligomer is also provided.

20 Claims, 6 Drawing Sheets

(56) References Cited

U.S. PATENT DOCUMENTS

| | | |
|---|---|---|
| 2002/0102380 A1 | 8/2002 | Armand |
| 2006/0035129 A1 | 2/2006 | Nomura |
| 2006/0063178 A1 | 3/2006 | Rauh-Adelmann et al. |
| 2006/0099512 A1 | 5/2006 | Nakai et al. |
| 2007/0128516 A1 | 6/2007 | Im |
| 2009/0017360 A1 | 1/2009 | Mohwald et al. |
| 2009/0286157 A1 | 11/2009 | Chen |
| 2013/0209893 A1 | 8/2013 | Archer |
| 2014/0011094 A1 | 1/2014 | Park |
| 2014/0147741 A1 | 5/2014 | Shin |
| 2014/0272572 A1 | 9/2014 | Chu |
| 2014/0346618 A1 | 11/2014 | Lahlouh |
| 2016/0164081 A1 | 6/2016 | Cui |
| 2016/0248121 A1 | 8/2016 | Uematsu |

FOREIGN PATENT DOCUMENTS

| | | |
|---|---|---|
| JP | 2011014298 A | 1/2011 |
| JP | 2012089399 A | 5/2012 |
| KR | 2014 0032835 | 3/2014 |
| KR | 2016 0019704 | 2/2016 |
| WO | 00/31101 | 6/2000 |
| WO | 2009/041399 | 4/2009 |
| WO | 2014/189923 | 11/2014 |

OTHER PUBLICATIONS

Parak et al., "Conjugation of DNA to Silanized Colloidal Semiconductor Nanocrystalline Quantum Dots," Chemistgry of Materials, vol. 14, No. 5, May 1, 2002, pp. 2113-2119.

Davenas et al., "Silicon naowire/poly(3-hexylthiophene) hybrids for thin film solar cells," Journal of Non-Crystalline Solids., vol. 358, No. 17, Sep. 1, 2012, pp. 2534-2536.

Sudeep et al., "PEGylated silicon nanoparticles: synthesis and characterization," Chemical Communications—Chemcom., No. 46, Jan. 1, 2008, p. 6126.

Maurice et al., "Polymer-Grafted Silicon Nanoparticles Obtained Either via Peptide Bonding or Click Chemistry," Macromolecular Chemistry and Physics., vol. 213, No. 23, Dec. 13, 2012, pp. 2498-2503.

Richner et al., "Grafted and crosslinked carbon black as an elecrode material for double layer capacitors," Carbon, Elsevier, Oxford, GB, vol. 40, No. 3, Mar. 1, 2002, pp. 307-314.

Andersen et al., "A Nanoparticle Approach towards Morphology Controlled Organic Photovoltaics (OPV)", Polymers, vol. 4, No. 4, Jun. 11, 2012, pp. 1242-1258.

Internaional Preliminary Report on Patentability in PCT/GB2016/053594, dated May 22, 2018.

SURFACE MODIFICATION

CROSS-REFERENCE TO RELATED APPLICATIONS

This application is a divisional of U.S. patent application Ser. No. 15/777,104, filed May 17, 2018, which is a U.S. national stage application of International Patent Application no. PCT/GB2016/053594, filed Nov. 17, 2016, which claims the benefit of priority of United Kingdom Patent Application no. 1520276.5, filed Nov. 17, 2015.

FIELD OF THE INVENTION

This invention relates in general to electrochemically active materials for use in electrodes for metal-ion batteries and more specifically to particulate electrochemically active materials suitable for use as anode active materials in metal-ion batteries. Also provided are processes for the preparation of the electrochemically active materials of the invention.

BACKGROUND

A conventional electrochemical cell comprises a positive electrode, a negative electrode and an electrolyte. During discharging, the negative electrode is referred to as the anode and the positive electrode is referred to as the cathode. For example, in a lithium ion secondary (rechargeable) battery, lithium ions are transported through the electrolyte to the anode. The anode may typically have a surface that comprises silicon, germanium, carbon (e.g. graphite) or a mixture thereof. On contact with the electrolyte, a solid electrolyte interphase (SEI) layer is formed. The SEI layer is a compound formed from a reaction between the supporting electrolyte molecules and the silicon-, germanium- or carbon-comprising surface. This is usually considered to be a desirable feature, since it allows metal ions such as lithium ions to intercalate with the graphite negative electrode surface or alloy with the silicon or germanium negative electrode surface, whilst preventing further reaction between the electrolyte and the negative electrode.

Unfortunately, the SEI layer contributes to a reduction in efficiency of the electrochemical cell in the first cycle, known as first cycle loss. The formation of the SEI layer on the anode causes loss of electrolyte, electrode surface material and metal ions. This reduces the efficiency of the first cycle of the electrochemical cell. This applies to electrochemically active materials with surfaces that comprise silicon, germanium, carbon or mixtures thereof.

For a surface comprising carbon (e.g. in the form of graphite, the first cycle loss has the greatest effect on the cell capacity of the electrochemical cell. There is a slight reduction of efficiency in subsequent cycles because, despite the SEI layer, supporting electrolyte molecules (e.g. carbonates) are still able to filtrate in between the graphene layers of the graphite negative electrode surface, which blocks some of the available routes for lithium ions to intercalate, i.e. lithium ions are less able to filtrate between the graphene layers. Additionally, the graphite surface may suffer from "exfoliation": the peeling off of graphene layers due to the degradation caused by reaction with supporting electrolyte molecules. The SEI layer to some extent prevents this.

For a surface that comprises silicon and/or germanium, the first cycle loss and subsequent cycle losses both have a large effect on the cell capacity of the electrochemical cell. Silicon, germanium and graphite anode materials are prone to expand and contract during charging and discharging of the cell, i.e. during lithiation and dilithiation for a lithium ion electrochemical cell. The amount of expansion and contraction is sufficiently high, especially in the case of silicon and germanium, to cause the inelastic SEI layer to crack and flake off or crack and accumulate at the anode surface. This exposes more of the anode surface, so that the newly exposed surface will react with the electrolyte to form more SEI layer. This phenomenon wastes material and reduces the efficiency of the cell: silicon or germanium and electrolyte are wasted in creating fresh SEI layers where electrode surface is exposed when the SEI layer cracks; lithium is wasted as it is trapped in the SEI layer. Further, the volume of the negative electrode may increase due to the thickening SEI layer which decreases the distance between the positive and negative electrodes. This in turn may damage the cell. Further, the SEI layer is electrically insulating which is undesirable at the anode. Additionally, the excess formation of SEI can block pores within the negative electrode layer and prevent electrolyte access to some regions of the negative electrode. As a result the cell capacity decreases with every cell cycle.

Commonly, electrolytes are provided with additives. The additives may be targeted to address the deficiencies of the SEI layer noted above. For example, vinylene carbonate and fluoroethylene carbonate are commonly included to improve the strength and flexibility of the SEI layer. Nevertheless, the additives in an electrolyte are unable to prevent the formation of an SEI layer because they cannot prevent contact, and therefore reaction, between the electrolyte and the negative electrode. Additionally, it is desirable to reduce the use of electrolyte additives because they may decompose within the cell and their effectiveness will be dependent on the first formation cycle regime used by the cell manufacturer. For example, a rest period at a known voltage may promote a specific variant of SEI formation, whilst a constantly sweeping voltage may promote a different variant. Another drawback of the electrolyte additive approach is that the accuracy and precision of the modification of the SEI with the electrolyte additives is difficult to achieve. The SEI layer in this setup may still suffer from cracking and thickening.

Another way in which the problems of SEI layers have been addressed is by coating the anode surface. Coatings such as pyrolised carbon and polyaniline are typically used. Such a coating is usually applied by utilising a solution of the polymer. The polymer coating may have a thickness in the order of 10s of nm or thicker. These coating offer some limited protection from electrolyte decomposition at the electrode/electrolyte interface. However, the practical applications of such coatings are limited. In particular, such coatings are permeable to supporting electrolyte molecules, so conventional SEI material may still be able to form. Additionally, coatings tend to be continuous and thus are susceptible to cracking and peeling off during charging and discharging cell cycles, in which the negative electrode expands and contracts as metal ions are incorporated and released.

A coating is discussed in US2014/272572A1. A silicon alloy electrode active material for a lithium secondary battery is coated with a film containing 3,4-ethylenedioxythiophene and oxyalkylene repeating units. The total number of repeating units is in the range of 40-5000. The film is 0.01-0.1 μm thick and is used to suppress the expansion of lithium during lithiation (intercalation of lithium ions into the anode active material during discharging of the battery). Unfortunately, sulphur-containing polymers are not compatible with conventional lithium ion battery components.

Another problem with the film coating of US2014/272572A1 is that it relies on the film not breaking during expansion of the electrode. The integrity of the film cannot be guaranteed and thus a conventional SEI layer may still form on the electrode surface.

Another coating is discussed in WO2009/014399A2. A core-shell electrode active material is proposed as an SEI-prevention measure. The core is a metal or metalloid and the shell is a polymer selected based on its glass transition temperature, for example styrene butadiene rubber (SBR) or polyethylene glycol methyl ether. The polymer shell is deposited onto the core in a conventional coating arrangement with a coating thickness of e.g. 25-45 nm. With this arrangement, an energy barrier is created such that it is more difficult for lithium ions to reach the core and intercalate. Additionally, rubbers such as SBR may be considered electrical insulators and thus an SBR coating, whilst able to accommodate some expansion of the electrode material, may decrease the efficiency of the electrode.

A further coating is discussed in US2014/295267A1. A silicon composite particle is coated with polyaniline. The polyaniline coating is covalently bonded to the particle for better electrical contact and to increase the hardness of the coating. However, such a coating is still subject to rupture during the lithiation of the silicon, thus the silicon surface is at risk of being exposed to the electrolyte and forming conventional SEI material. Additionally, a polymeric coating may block access to the silicon surface for lithium ions, thus decreasing efficiency of the electrode.

In view of the problems noted with existing technologies in the field, it is desirable to provide an electrochemically active material suitable for use at the surface of a negative electrode in an electrochemical cell that reduces or prevents loss of capacity during each cell cycle. Additionally, it is desirable to avoid the thickening associated with the continual generation of conventional SEI material.

Additionally it is desirable to provide an electrochemically active material suitable for use at the surface of a negative electrode in an electrochemical cell which does not result in wastage of materials through undesirable reactions between the negative electrode and the electrolyte.

Further, it is desirable to provide an electrochemically active material suitable for use at the surface of a negative electrode in an electrochemical cell that reduces or eliminates the need for additives in the electrolyte, thus enabling the use of generic electrolytes. The present invention solves these problems.

SUMMARY OF THE INVENTION

According to a first aspect of the invention, an electrochemically active material is provided. The electrochemically active material comprising a surface, wherein a linear or branched oligomeric moiety is covalently bonded to the surface, said oligomeric moiety being selected form the group consisting of: Formula I, Formula II, Formula III, and mixtures thereof, wherein the surface is bonded to the oligomeric moiety via group A, wherein A is silicon;

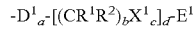  Formula I:

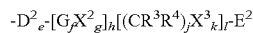  Formula II:

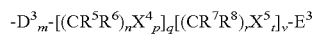  Formula III:

in which:
G is an aryl group selected from:

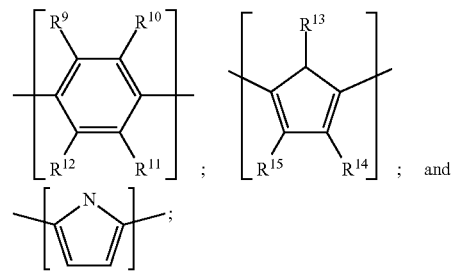

$R^1$, $R^2$, $R^3$, $R^4$, $R^7$ and $R^8$ are each independently selected from: H, F, fluorinated or non-fluorinated $C_{1-4}$ alkyl, fluorinated or non-fluorinated $C_{1-4}$ hydroxyalkyl, phenyl;
$R^5$ and $R^6$ are each independently selected from Formula IV;

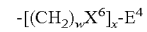  Formula IV:

$R^9$, $R^{10}$, $R^{11}$, $R^{12}$, $R^{13}$, $R^{14}$ and $R^{15}$ are each independently selected from: H, F, $CH_3$,
$X^1$, $X^2$, $X^3$, $X^4$, $X^5$ and $X^6$ are each independently selected from: O, PH, Se and NH;
$D^1$, $D^2$ and $D^3$ are each independently a fluorinated or non-fluorinated first end group selected from the group consisting of: $C_{1-4}$ alkanediyl, $C_{2-4}$ alkenediyl, $C_{2-4}$ alkynediyl, a hydroxy substituted $C_{1-4}$ alkanediyl, $C_{1-4}$ alkanediyloxy, $C_{2-4}$ alkenediyloxy, $C_{2-4}$ alkynediyloxy, $C_{2-4}$ alkanoyloxy, $C_{3-4}$ alkenoyloxy, $C_{3-4}$ alkynoyloxy, $C_{1-4}$ alkanediyloxycarbonyl, $C_{2-4}$ alkenediyloxycarbonyl, $C_{2-4}$ alkyldiyloxycarbonyl;
$E^1$, $E^2$, $E^3$ and $E^4$ are each independently a second end group selected from the group consisting of:
  linear and branched, optionally substituted, alkyl groups of the formula —$(CH_2)_yCH_3$, wherein $0 \leq y \leq 9$;
  linear and branched aryl or alkaryl groups of the formula —$(CH_2)_{aa}C_6H_{ab}F_{ac}$, wherein $0 \leq aa \leq 6$, and the sum of ab and ac is 5;
  linear and branched fluorinated alkyl groups of the formula —$(CH_2)_{ad}(CF_2)_{ae}CF_3$, wherein $0 \leq ad \leq 6$ and $0 \leq ae \leq 9$;
  hydroxyl;
  hydrogen;
  —$NR^{16}_2$, wherein each $R^{16}$ is independently selected from H and $C_{1-4}$ alkyl;
  nitro group; and
  ester groups —$COOR^{17}$ and $OCOR^{17}$ where $R^{17}$ is H or $C_{1-4}$ alkyl;
a=0 or 1;
b=from 2 to 6;
c=0 or 1;
d=from 0 to 16;
e=0 or 1;
f=from 2 to 6;
g=0 or 1;
h=from 1 to 16;
j=from 2 to 6;
k=0 or 1;
l=from 0 to 15;
h+l=from 2 to 16;
m=0 or 1;

n=from 2 to 6;
p=0 or 1;
q=from 1 to 16;
r=from 2 to 6
t=0 or 1
v=0 to 15
q+v=from 2 to 16
w=2 to 6
x=from 1 to 15.

All numbers are preferably integers.

In Formula I where d is greater than 1, each unit of $[(CR^1R^2)_b X^1_c]$ may be the same or different. Where the units of $[(CR^1R^2)_b X^1_c]$ are different, they may be in a random copolymer arrangement or a block copolymer arrangement. Where b is 2 or more, each $R^1$ and each $R^2$ need not be the same. For example, a monomeric unit of $CHFCH_2O$ is possible.

In Formula II where h is greater than 1, each unit of $[G_f X^2_g]$ may be the same or different. Where the units of $[G_f X^2_g]$ are different, they may be in a random copolymer arrangement or a block copolymer arrangement. In Formula II where l is greater than 1, each unit of $[(CR^3R^4)_j X^3_k]$ may be the same or different. Where j is 2 or more, each $R^3$ and each $R^4$ need not be identical. For example, a monomeric unit of $CHFCH_2O$ is possible. Where the units of $[(CR^3R^4)_j X^3_k]$ are different, they may be in a random copolymer arrangement or a block copolymer arrangement. In Formula II, where the sum of h and l is at least 3, the units $[G_f X^2_g]$ and $[(CR^3R^4)_j X^3_k]$ may be in a random copolymer arrangement or a block copolymer arrangement.

In Formula III where q is greater than 1, each unit of $[(CR^5R^6)_n X^4_p]$ may be the same or different. Where the units of $[(CR^5R^6)_n X^4_p]$ are different, they may be in a random copolymer arrangement or a block copolymer arrangement. Where n is greater than or equal to 2, each $R^5$ and each $R^6$ need not be identical. For example, a monomeric unit of $CHFCH_2O$ is possible. In Formula III where v is greater than 1, each unit of $[(CR^7R^8)_r X^5_t]$ may be the same or different. Where the units of $[(CR^7R^8)_r X^5_t]$ are different, they may be in a random copolymer arrangement or a block copolymer arrangement. Where r is greater than or equal to 2, each $R^7$ and each $R^8$ need not be identical. For example, a monomeric unit of $CHFCH_2O$ is possible. In Formula III, where the sum of q and v is at least 3, the units $[(CR^5R^6)_n X^4_p]$ and $[(CR^7R^8)_r X^5_t]$ may be in a random copolymer arrangement or a block copolymer arrangement.

Electrochemically active materials according to the first aspect of the invention may be useful in improved metal ion secondary batteries as a negative electrode material. Including them at the negative electrode may improve capacity retention and increase specific capacity by reducing interaction between the electrolyte and the surface of the negative electrode.

According to a second aspect of the invention, a particle is provided. The particle comprises the electrochemically active material of the first aspect of the invention.

According to a third aspect of the invention, a powder is provided. The powder comprises a plurality of particles in accordance with the second aspect of the invention.

According to a fourth aspect of the invention, a thin film is provided. The thin film comprises the electrochemically active material of the first aspect of the invention.

According to a fifth aspect of the invention, a composite electrode layer is provided. The composite electrode layer comprises a particle of the second aspect of the invention, or a powder of the third aspect of the invention and at least one other component selected from (a) a binder, (b) a conductive additive and (c) particles of a further electrochemically active material.

According to the sixth aspect of the invention, a negative electrode is provided. The negative electrode comprises (i) a current collector and (ii) a composite electrode layer according to the fifth aspect of the invention or a thin film according to the fourth aspect of the invention.

According to a seventh aspect of the invention, a metal-ion battery is provided. The metal-ion battery comprises:
 a) the negative electrode of the sixth aspect of the invention;
 b) a positive electrode; and
 c) an electrolyte between the negative electrode and the positive electrode.

According to an eighth aspect of the invention, a method of modifying a surface of an electrochemically active material is provided. The method comprises:
 a. providing an electrochemically active material that comprises a surface, wherein the surface comprises silicon,
 b. providing an oligomeric moiety selected from the group consisting of: Formula I, Formula II, Formula II, and mixtures thereof,
 c. washing the surface with a fluoride solution, thereby forming an Si—H group on the surface,
 d. applying the oligomeric moiety to the washed surface resulting from step (c).

DETAILED DESCRIPTION

Oligomer

Figure 1A:
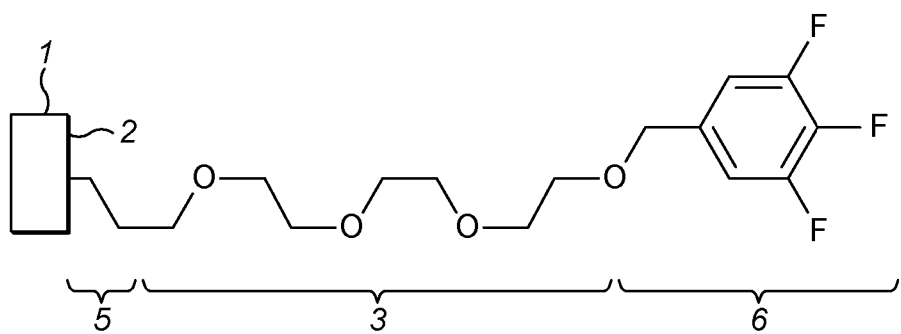
FIG. 1A shows a specific example of an oligomeric moiety covalently bonded to an electrochemically active surface.

The oligomer is a short-chain polymer with 0-16 monomer units, preferably 1-16 monomer units making up a linker group and an end group at each end, referred to as the first end group and the second end group.

The oligomer may be attached to the surface of the electrochemically active material. Preferably, only the first end group bonds to the surface. The oligomer may be grafted to or from the surface. Grafting to the surface means that the oligomer is already assembled before it is attached to the surface. Grafting from the surface means that the first end group is attached to the surface, then the linker group is attached to the first end group, then the second end group is attached to the linker group.

The electrochemically active material preferably comprises an array of oligomeric moieties covalently bonded to the surface, wherein each oligomeric moiety in the array is independently selected from the group consisting of Formula I, or Formula II or Formula III. The oligomeric moieties in the array may all be selected from one of Formula I, or Formula II or Formula III. Further, at least 50% of the oligomeric moieties covalently bonded to the surface may be the same, preferably at least 80%, more preferably at least 90%.

Where an array of oligomeric is provided, from 5 to 100% of the area of the surface is covered by oligomeric moieties. Surface area may be measured by gas adsorption techniques such as Brunauer-Emmet-Teller. % coverage can be inferred by the relationship of % wt C in the product and surface area.

When an array of oligomeric moieties are covalently bonded to the surface, they may together act in a manner analogous to ion channels found in biology. The oligomers extend radially outward from the surface, forming these channels. The channels allow metal ions, for example lithium ions or sodium ions in a cell, to reach the surface, whilst excluding supporting electrolyte molecules, for example alkyl carbonates.

The ion channels created by an array of oligomers attached to the surface may also play a key role in preventing the formation of a conventional SEI layer. Since the oligomers may typically extend radially outward from the surface, this array is not subject to cracking in the same manner as conventional coatings are during intercalation of metal ions into the electrochemically active material in the context of a secondary battery, for example by lithiation. This may be because the oligomers attach to the surface only via the first end group with an ether or siloxane and because the oligomers do not cross link with each other.

In the context of a metal ion secondary battery, metal ions may shuffle along the "ion channel" created by the oligomers from the electrolyte to the surface of the negative electrode.

Preferably the oligomer is free from sulphur atoms. Excluding sulphur from the oligomer may increase the compatibility of the electrochemically active material of the invention with other commonly used metal ion secondary battery components. For example, $Li_2S$ and Li-ion battery components are not generally compatible.

Oligomeric Moiety

Between the end groups, the oligomeric moiety may have any of the formulae

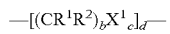  Formula IA:

  Formula IIA:

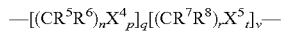  Formula IIIA:

The oligomeric moiety in between the end groups may be linear according to Formula IA or Formula IIA. A linear oligomeric moiety may be preferred as it may result in an increased diameter of the ion channels created by an array of oligomers as there is less steric hindrance within the channel and thus may reduce the energy barrier for a metal ion to reach the surface of the electrochemically active material.

Within each monomeric unit, each R group need not be identical. For example, in Formula IA where the unit $(CR^1R^2)_bX^1_k$ appears, a monomeric unit $CHFCH_2O$ is possible as well as $CH_2CH_2O$, $CHFCHFO$ and other variations. This also applies to R groups in the other linker group formulae and R groups in the first and second end groups.

In Formula IA, $R^1$ and $R^2$ may each independently be H, F, fluorinated or non-fluorinated $C_{1-4}$ alkyl, fluorinated or non-fluorinated $C_{1-4}$ hydroxyalkyl, or phenyl. Phenyl groups may increase the rigidity of the oligomeric moiety. Where one of $R^1$ and $R^2$ are fluorine, the oligomeric moiety may be better able to shuffle metal ions towards the surface, due to the increase in electronegativity in the ions channels that are created by an array of oligomers. Additionally, fluorine atoms may aid in chelating metal ions in the ion channel by providing extra points for chelation and by increasing the electronegativity of the heteroatoms $X^1$.

Preferably the oligomeric moiety as a whole is not perfluorinated because perfluorinated groups are both oleophobic and hydrophobic simultaneously, making it difficult to process these materials.

In a preferred embodiment, $R^1=R^2=H$. Using H may increase the diameter of the ion channels created by an array of oligomers and thus may reduce the energy barrier for a metal ion to reach the surface of the electrochemically active material.

b may be from 2 to 6, preferably 2 to 4, most preferably 2 or 3. These values may be chosen to increase the ratio of heteroatoms to carbon atoms in the oligomeric moiety. This increases the electronegativity in the ion channels.

d may be from 0 to 16. If d=0, the oligomeric moiety must have a first end group $D^1$ and a second end group $E^1$. Preferably d is from 2 to 16, more preferably from 2 to 12, more preferably from 2 to 10, most preferably from 2 to 6. Oligomeric moieties of this length may present an optimum balance between deterring electrolyte and allowing metal ions to reach the surface. Each unit $[(CR^1R^2)_bX^1_c]$ may be the same. Alternatively, each unit $[(CR^1R^2)_bX^1_c]$ may be different from adjacent units.

$X^1$ may be O, NH, PH or Se. Preferably $X^1$ is O, PH or Se. Most preferably, $X^1$ is O. These heteroatoms, regularly spaced along the linker group, may temporarily chelate metal ions in a manner mimicking the supporting electrolyte molecules. This chelation may help to lower the energy barrier for the electrolyte to release metal ions to the oligomers. O, NH, PH and Se are suitable due to their electronegativity, which is attractive to metal ions.

Some units of $[(CR^1R^2)_bX^1_c]$ may have c=0. Preferably, c=1 in all units of $[(CR^1R^2)_bX^1_c]$.

In a preferred embodiment, b=2 or 3, c=1, d=2 to 6, $R^1=R^2=H$ and $X^1$ is O. In other words, Formula IA is preferably linear non-fluorinated polyethylene oxide or polypropylene oxide with 2 to 6 repeating units. This embodiment may enable an array of such oligomeric moieties to best mimic the chelation of metal ions by the electrolyte and thus best enable transfer of metal ions from the electrolyte to the electrochemically active material.

In Formula IIA $R^3$ and $R^4$ may each independently be H, F, fluorinated or non-fluorinated $C_{1-4}$ alkyl, fluorinated or non-fluorinated $C_{1-4}$ hydroxyalkyl, or phenyl. Phenyl groups may increase the rigidity of the oligomeric moiety. Where one of $R^3$ and $R^4$ are fluorine, the oligomeric moiety may be better able to shuffle metal ions towards the surface, due to the increase in electronegativity in the ions channels that are created by an array of oligomers. Additionally, fluorine atoms may aid in chelating metal ions in the ion channel by providing extra points for chelation and by increasing the electronegativity of the heteroatoms $X^3$. Preferably the oligomeric moiety as a whole is not perfluorinated because perfluorinated groups are both oleophobic and hydrophobic simultaneously, making it difficult to process these materials.

In a preferred embodiment, $R^3=R^4=H$. Using H may increase the diameter of the ion channels created by an array of oligomers and thus may reduce the energy barrier for a metal ion to reach the surface of the electrochemically active material.

G is an aryl group selected from:

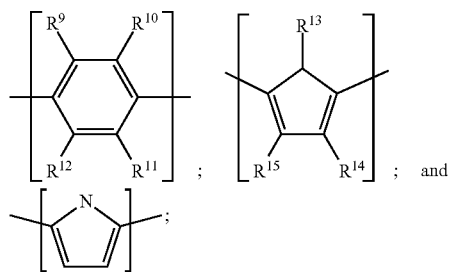

$R^9$, $R^{10}$, $R^{11}$, $R^{12}$, $R^{13}$, $R^{14}$ and $R^{15}$ are each independently selected from: H, F, $CH_3$.

Preferably $R^9$, $R^{10}$, $R^{11}$, $R^{12}$, $R^{13}$, $R^{14}$ and $R^{15}$ are each H. Using H may increase the diameter of the ion channels created by an array of oligomers and thus may reduce the energy barrier for a metal ion to reach the surface of the electrochemically active material.

f may be from 2 to 6, preferably 2 to 4, most preferably 2 or 3. These values may be chosen to increase the ratio of heteroatoms to carbon atoms in the oligomeric moiety. This increases the electronegativity in the ion channels.

j may be from 2 to 6, preferably 2 to 4, most preferably 2 or 3. These values may be chosen to increase the ratio of heteroatoms to carbon atoms in the oligomeric moiety. This increases the electronegativity in the ion channels.

The sum of h and l is from 2 to 16, preferably from 2 to 12, more preferably from 2 to 10, most preferably from 2 to 6. Oligomeric moieties of this length may present an optimum balance between deterring electrolyte and allowing metal ions to reach the surface. Each unit $[G_fX^2_g]$ may be the same. Alternatively, each unit $G_fX^2_g]$ may be different from adjacent units. Each unit $[(CR^3R^4)_jX^3_k]$ may be the same. Alternatively, each unit $[(CR^3R^4)_jX^3_k]$ may be different from adjacent units. There may be a regular pattern of $[G_fX^2_g]$ and optional $[(CR^3R^4)_jX^3_k]$ units, or there may be an irregular pattern.

$X^2$ and $X^3$ are each independently selected from O, NH, PH or Se. Preferably $X^2$ and $X^3$ are each independently selected from O, PH or Se. Most preferably, $X^2$ and $X^3$ are O. These heteroatoms, regularly spaced along the linker group, may temporarily chelate metal ions in a manner mimicking the supporting electrolyte molecules. This chelation may help to lower the energy barrier for the electrolyte to release metal ions to the oligomers. O, NH, PH and Se are suitable due to their electronegativity, which is attractive to metal ions.

Some units of $[G_fX^2_g]$ may have g=0. Preferably, g=1 in all units of $[G_fX^2_g]$.

Some units of $[(CR^3R^4)_jX^3_k]$ may have k=0. Preferably, k=1 in all units of $[(CR^3R^4)_jX^3_k]$.

The oligomeric moiety in between the end groups may be branched according to Formula IIIA. Branching may occur at every monomer, which is sometimes referred to as "hyperbranched". In the case of hyperbranching, v is 0. Alternatively, branching may occur sporadically, and thus v is in the range 1 to 15, that is there are unbranched monomers present. As used here, "branched" covers both alternatives. When the invention is used in an electrochemical cell, branched oligomeric moieties may result in a higher density layer at the electrolyte end of the oligomer compared to the end of the oligomer nearest to the surface of the electrochemically active material. This may be advantageous in order to minimise the amount of electrolyte that is able to reach the surface of the electrochemically active material, whilst maximising the electrical conductivity of the surface of the electrochemically active material by leaving as much of the surface exposed to incoming metal ions as possible.

In Formula IIIA $R^7$ and $R^8$ may each independently be H, F, fluorinated or non-fluorinated $C_{1-4}$ alkyl, fluorinated or non-fluorinated $C_{1-4}$ hydroxyalkyl, or phenyl. Phenyl groups may increase the rigidity of the oligomeric moiety. Where one of $R^7$ and $R^8$ are fluorine, the oligomeric moiety may be better able to shuffle metal ions towards the surface, due to the increase in electronegativity in the ions channels that are created by an array of oligomers. Additionally, fluorine atoms may aid in chelating metal ions in the ion channel by providing extra points for chelation and by increasing the electronegativity of the heteroatoms $X^5$. Preferably the oligomeric moiety as a whole is not perfluorinated because perfluorinated groups are both oleophobic and hydrophobic simultaneously, making it difficult to process these materials.

In a preferred embodiment, $R^7=R^8=H$. Using H may increase the diameter of the ion channels created by an array of oligomers and thus may reduce the energy barrier for a metal ion to reach the surface of the electrochemically active material.

$R^5$ and $R^6$ are each independently selected from Formula IV;

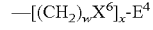 Formula IV:

w is from 2 to 6, preferably from 2 to 4, most preferably from 2 or 3. x is from 1 to 15, preferably from 2 to 12, preferably from 2 to 10, more preferably from 2 to 6. n may be from 2 to 6, preferably 2 to 4, most preferably 2 or 3. These values may be chosen to increase the ratio of heteroatoms to carbon atoms in the oligomeric moiety. This increases the electronegativity in the ion channels.

r may be from 2 to 6, preferably 2 to 4, most preferably 2 or 3. These values may be chosen to increase the ratio of heteroatoms to carbon atoms in the oligomeric moiety. This increases the electronegativity in the ion channels.

The sum of q and v is from 2 to 16, preferably from 2 to 12, more preferably from 2 to 10, most preferably from 2 to 6. Oligomeric moieties of this length may present an optimum balance between deterring electrolyte and allowing metal ions to reach the surface. Each unit $[(CR^5R^6)_nX^4_p]$ may be the same. Alternatively, each unit $[(CR^5R^6)_nX^4_p]$ may be different from adjacent units. Each unit $[(CR^7R^8)_rX^5_t]$ may be the same. Alternatively, each unit $[(CR^7R^8)_rX^5_t]$ may be different from adjacent units. There may be a regular pattern of $[(CR^5R^6)_nX^4_p]$ and optional $[(CR^7R^8)_rX^5_t]$ units, or there may be an irregular pattern.

$X^4$ and $X^5$ are each independently selected from O, NH, PH or Se. Preferably $X^4$, $X^5$ and $X^6$ are each independently selected from O, PH or Se. Most preferably, $X^4$, $X^5$ and $X^6$ are O. These heteroatoms, regularly spaced along the linker group, may temporarily chelate metal ions in a manner mimicking the supporting electrolyte molecules. This chelation may help to lower the energy barrier for the electrolyte to release metal ions to the oligomers. O, NH, PH and Se are suitable due to their electronegativity, which is attractive to metal ions.

Some units of $[(CR^5R^6)_nX^4_p]$ may have p=0. Preferably, p=1 in all units of $[G_fX^2_g]$.

Some units of $[(CR^7R^8)_rX^5_t]$ may have t=0. Preferably, t=1 in all units of $[(CR^7R^8)_rX^5_t]$ Preferably the groups —$[(CR^1R^2)_bX^1_c]_d$—, —$[(CR^3R^4)_jX^3_k]_l$— and —$[(CR^7R^8)_rX^5_t]_v$— of Formulae I, II and III, respectively, are each independently selected from the group consisting of: non-fluorinated linear or branched polyethylene oxide, non-fluorinated linear or branched polypropylene oxide, fluorinated linear or branched polyethylene oxide, fluorinated linear or branched polypropylene oxide, or a mixture thereof, preferably linear non-fluorinated polyethylene oxide. Preferably b, j and r are each independently 2 to 12, preferably 2 to 10, most preferably 2 to 6.

In a first preferred embodiment, the oligomeric moiety is of Formula I:

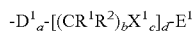

in which
- $R^1$ and $R^2$ are each independently selected from: H, F, fluorinated or non-fluorinated $C_{1-4}$ alkyl, fluorinated or non-fluorinated $C_{1-4}$ hydroxyalkyl, phenyl;
- $X^1$ are each independently selected from: O, PH, Se and NH;
- $D^1$ are each independently a first end group;
- $E^1$ are each independently a second end group;
- a=0 or 1;
- b=from 2 to 6;
- c=0 or 1;
- d=from 0 to 16.

In a second preferred embodiment, the oligomeric moiety is of Formula I:

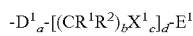

in which
- $R^1$ and $R^2$ are each independently selected from: H, F, fluorinated or non-fluorinated $C_{1-4}$ alkyl;
- $X^1$ are each independently selected from: O, PH and Se;
- $D^1$ are each independently a first end group;
- $E^1$ are each independently a second end group;
- a=0 or 1;
- b=from 2 to 4;
- c=1;
- d=from 2 to 12.

In a third preferred embodiment, the oligomeric moiety is of Formula I:

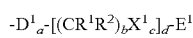

in which
- $R^1$ and $R^2$ are each independently selected from: H or F;
- $X^1$ are each O;
- $D^1$ are each independently a first end group;
- $E^1$ are each independently a second end group;
- a=0 or 1;
- b=from 2 to 4;
- c=1;
- d=from 2 to 10.

In a fourth preferred embodiment, the oligomeric moiety is of Formula I:

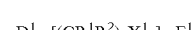

in which
- $R^1$ and $R^2$ are each independently selected from: H or F;
- $X^1$ are each O;
- $D^1$ are each independently a first end group;
- $E^1$ are each independently a second end group;
- a=0 or 1;
- b=2 or 3;
- c=1;
- d=from 2 to 6.

In a fifth preferred embodiment, the oligomeric moiety is of Formula II:

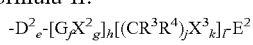

in which
G is an aryl group selected from:

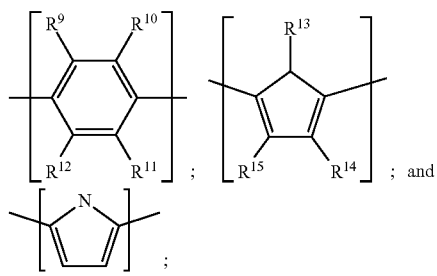

- $R^3$ and $R^4$ are each independently selected from: H, F, fluorinated or non-fluorinated $C_{1-4}$ alkyl, fluorinated or non-fluorinated $C_{1-4}$ hydroxyalkyl, phenyl;
- $R^9$, $R^{10}$, $R^{11}$, $R^{12}$, $R^{13}$, $R^{14}$ and $R^{15}$ are each independently selected from: H, F, $CH_3$,
- $X^2$ and $X^3$ are each independently selected from: O, PH, Se and NH;
- $D^2$ are each independently a first end group;
- $E^2$ are each independently a second end group;
- e=0 or 1;
- f=from 2 to 6;
- g=0 or 1;
- h=from 1 to 16;
- j=from 2 to 6;
- k=0 or 1;
- l=from 0 to 15;
- h+l=from 2 to 16.

In a sixth preferred embodiment, the oligomeric moiety is of Formula II:

in which
G is an aryl group selected from:

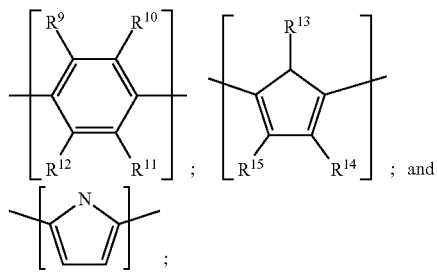

- $R^3$ and $R^4$ are each independently selected from: H, F, fluorinated or non-fluorinated $C_{1-4}$ alkyl;

$R^9$, $R^{10}$, $R^{11}$, $R^{12}$, $R^{13}$, $R^{14}$ and $R^{15}$ are each independently selected from: H, F, $CH_3$, $X^2$ and $X^3$ are each independently selected from: O, PH and Se;

$D^2$ are each independently a first end group;

$E^2$ are each independently a second end group;

e=0 or 1;

f=from 2 to 4;

g=1;

h=from 1 to 12;

j=from 2 to 4;

k=1;

l=from 0 to 11;

h+l=from 2 to 12.

In a seventh preferred embodiment, the oligomeric moiety is of Formula II:

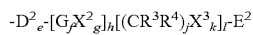

in which

G is an aryl group selected from:

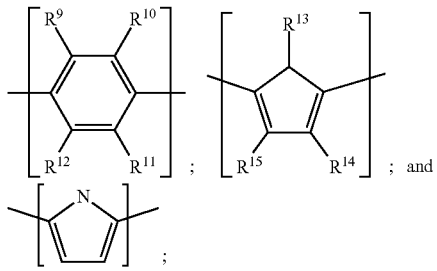

$R^3$ and $R^4$ are each independently selected from: H or F;

$R^9$, $R^{10}$, $R^{11}$, $R^{12}$, $R^{13}$, $R^{14}$ and $R^{15}$ are each independently selected from: H or F;

$X^2$ and $X^3$ are each O;

$D^2$ are each independently a first end group;

$E^2$ are each independently a second end group;

e=0 or 1;

f=from 2 to 4;

g=1;

h=from 1 to 10;

j=from 2 to 4;

k=1;

l=from 0 to 9;

h+l=from 2 to 10.

In an eighth preferred embodiment, the oligomeric moiety is of Formula II:

in which

G is an aryl group selected from:

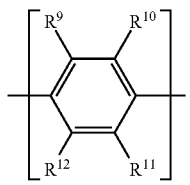

$R^3$ and $R^4$ are each independently selected from: H or F;

$R^9$, $R^{10}$, $R^{11}$, are each independently selected from: H or F;

$X^2$ and $X^3$ are each O;

$D^2$ are each independently a first end group;

$E^2$ are each independently a second end group;

e=0 or 1;

f=2 or 3;

g=1;

h=from 1 to 6;

j=2 or 3 4;

k=1;

l=from 0 to 5;

h+l=from 2 to 6.

In a ninth preferred embodiment, the oligomeric moiety is of Formula III:

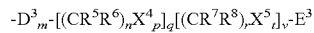

in which $R^7$ and $R^8$ are each independently selected from: H, F, fluorinated or non-fluorinated $C_{1-4}$ alkyl, fluorinated or non-fluorinated $C_{1-4}$ hydroxyalkyl, phenyl;

$R^5$ and $R^6$ are each independently selected from Formula IV;

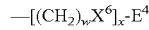           Formula IV:

$X^4$, $X^5$ and $X^6$ are each independently selected from: O, PH, Se and NH;

$D^3$ are each independently a first end group;

$E^3$ and $E^4$ are each independently a second end group;

m=0 or 1;

n=from 2 to 6;

p=0 or 1;

q=from 1 to 16;

r=from 2 to 6 t=0 or 1 v=0 to 15 q+v=from 2 to 16 w=2 to 6 x=from 1 to 15.

In a tenth preferred embodiment, the oligomeric moiety is of Formula III:

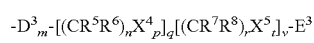

in which $R^7$ and $R^8$ are each independently selected from: H, F, fluorinated or non-fluorinated $C_{1-4}$ alkyl;

$R^5$ and $R^6$ are each independently selected from Formula IV;

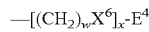           Formula IV:

$X^4$, $X^5$ and $X^6$ are each independently selected from: O, PH and Se;

$D^3$ are each independently a first end group;

$E^3$ and $E^4$ are each independently a second end group;

m=0 or 1;

n=from 2 to 4;

p=1;

q=from 1 to 12;

r=from 2 to 4 t=1 v=0 to 11 q+v=from 2 to 12 w=2 to 4 x=from 1 to 12.

In an eleventh preferred embodiment, the oligomeric moiety is of Formula III:

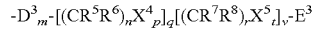

in which

R$^7$ and R$^8$ are each independently selected from: H or F;
R$^5$ and R$^6$ are each independently selected from Formula IV;

$$—[(CH_2)_wX^6]_x-E^4 \qquad \text{Formula IV:}$$

X$^4$, X$^5$ and X$^6$ are each O;
D$^3$ are each independently a first end group;
E$^3$ and E$^4$ are each independently a second end group;
m=0 or 1;
n=from 2 to 4;
p=1;
q=from 1 to 10;
r=from 2 to 4
t=1
v=0 to 9
q+v=from 2 to 10
w=2 to 4
x=from 1 to 10.

In a twelfth preferred embodiment, the oligomeric moiety is of Formula III:

$$-D^3{}_m-[(CR^5R^6)_nX^4{}_p]_q[(CR^7R^8)_rX^5{}_t]_v-E^3$$

in which

R$^7$ and R$^8$ are each independently selected from: H or F;
R$^5$ and R$^6$ are each independently selected from Formula IV;

$$—[(CH_2)_wX^6]_x-E^4 \qquad \text{Formula IV:}$$

X$^4$, X$^5$ and X$^6$ are each O;
D$^3$ are each independently a first end group;
E$^3$ and E$^4$ are each independently a second end group;
m=0 or 1;
n=2 or 3;
p=1;
q=from 1 to 6;
r=2 or 3
t=1
v=0 to 5
q+v=from 2 to 6
w=2 or 3
x=from 1 to 6.

Each oligomeric moiety preferably only has one bond to group A, that is, the linkage is as shown in in Formulae IB, IIB and IIIB.

$$A-D^1{}_a-[(CR^1R^2)_bX^1{}_c]_d-E^1 \qquad \text{Formula IB:}$$

$$A-D^2{}_e-[G_fX^2{}_g]_h[(CR^3R^4)_jX^3{}_k]_l-E^2 \qquad \text{Formula IIB:}$$

$$A-D^3{}_m-[(CR^5R^6)_nX^4{}_p]_q[(CR^7R^8)_rX^5{}_t]_v-E^3 \qquad \text{Formula IIIB:}$$

This may help enable metal ions to intercalate with the electrochemically active material by leaving some surface available. Additionally it may help accommodate the expansion experienced during the intercalation of the metal ions, such as by lithiation, since no stretching of the bonds in the oligomeric moiety is required when there is only one bond to the surface.

First End Group D$^1$, D$^2$ or D$^3$

The first end group may connect the oligomer to the surface of the electrochemically active material. The connection is via a surface-Si— covalent bond.

The precursor to the first end group is able to react with the activated surface silicon atoms, with silicon hydride groups. Suitable precursors include alkenes, alkynes, silanes and silanols.

The first end group may be a fluorinated or non-fluorinated C$_{1-4}$ alkanediyl, a fluorinated or non-fluorinated C$_{1-4}$ alkenyloxycarbonyl, a fluorinated or non-fluorinated C$_{1-4}$ alkenoyloxy group, a fluorinated or non-fluorinated C$_{1-4}$ alkanediyloxy, a silane group, a siloxane group or a combination thereof, preferably fluorinated or non-fluorinated C$_{1-4}$ alkanediyl, fluorinated or non-fluorinated C$_{1-4}$ alkanediyloxy and mixtures thereof. End groups longer than C$_4$ may present too high an energy barrier for metal ions to reach the surface of the electrochemically active material. The exact nature of the first end group may depend on the method used to bond it to the surface.

The first end group is covalently bonded to the surface and to the linker group (if present, or to the second end group if the linker group is not present).

Alkenediyl refers to a divalent group derived from an alkene, for example Si$_{surface}$—CH=CH$_2$—

Alkanediyl refers to a divalent group derived from an alkane, for example Si$_{surface}$—CH$_2$CH$_2$—

Alkynediyl refers to a divalent group derived from an alkyne, for example Si$_{surface}$—C≡C—

Diyls including an alcohol group (hydroxyl-substituted alkanediyls) include the structure Si$_{surface}$—(CH$_2$)$_{1-3}$CHOH—.

Alkanediyloxy refers to a divalent group derived from an ether, for example Si$_{surface}$—(CH$_2$)$_{1-4}$—O—

First end groups derived from esters are described either as alkanediyloxycarbonyl, for example Si$_{surface}$—(CH$_2$)$_{1-4}$—O—C(O)—, or as alkanediylcarbonyloxy groups, for example Si$_{surface}$—C(O)—O—.

Si$_{surface}$ refers to a silicon atom present at the surface of the electrochemically active material, which covalently bonds to the oligomeric moiety.

When the first end group is a silanediyl or a siloxane group, the second end group is preferably not an amino group. A siloxane group may react with a silicon surface to form a [Si]$_{surface}$—Si—C bond arrangement and a silane group may react with a silicon surface to form a [Si]$_{surface}$—Si—C bond arrangement.

Second End Group E$^1$, E$^2$, E$^3$ or E$^4$

The second end group may deter supporting electrolyte molecules from reaching the surface of the electrochemically active material by one or both of steric hindrance and electrostatic repulsion. Where the second end group provides steric hindrance, the end group may be polar without attracting supporting electrolyte molecules towards the surface of the electrochemically active material. This may help to attract metal ions, such as lithium ions or sodium ions towards the surface of the electrochemically active material.

Preferably, the second end groups are each independently selected from the group consisting of: linear or branched alkyl groups of the formula —(CH$_2$)$_y$CH$_3$, wherein 0≤y≤9; linear or branched phenyl groups of the formula —(CH$_2$)$_{aa}$C$_6$H$_{ab}$F$_{ac}$, wherein 0≤aa≤6, and the sum of ab and ac is 5; linear or branched fluorinated alkyl groups of the formula —(CH$_2$)$_{ad}$(CF$_2$)$_{ae}$CF$_3$, wherein 0≤ad≤6 and 0≤ae≤9; hydroxyl; hydrogen; a primary amino group; a secondary amino group; a nitro group, an ester group; a carboxylic acid group; and combinations thereof. More preferably the second groups are each independently selected from the group consisting of: linear or branched alkyl groups of the formula —(CH$_2$)$_y$CH$_3$, wherein 0≤y≤9; linear or branched phenyl groups of the formula —(CH$_2$)$_{aa}$C$_6$H$_{ab}$F$_{ac}$, wherein 0≤aa≤6, and the sum of ab and ac is 5; linear or branched fluorinated alkyl groups of the formula —(CH$_2$)$_{ad}$(CF$_2$)$_{ae}$CF$_3$, wherein 0≤ad≤6 and 0≤ae≤9; hydroxyl; hydrogen; and combinations thereof.

A fluorinated second end group may deter supporting electrolyte molecules by electrostatic repulsion whilst attracting metal cations.

The second end group preferably has a length of no more than 1 nm. A greater length may present too high an energy barrier in an electrochemical cell for metal ions to diffuse through and reach the linker group and ultimately reach the surface of the electrochemically active material.

Surface

The electrochemically active material has a surface that may comprise silicon, or mixtures thereof, that is, group A is preferably silicon.

Silicon and carbon may be used due to their excellent ability to transfer electrical charge in an electrochemical cell. In particular, these materials are able to interact effectively with lithium ions in a lithium ion battery to efficiently transfer electrical charge. Preferably, the surface of the electrochemically active material comprises silicon.

A silicon surface comprises a silanol terminated silicon oxide layer, prior to the activation step, comprising silanol (Si—OH) groups, siloxanes (Si—O—Si) and $SiO_2$. A germanium surface behaves in a similar manner to a silicon surface.

Prior to attaching the oligomer to the surface, the surface must be activated. Surface activation is necessary in order for the surface to have a reactive layer and to minimise surface oxide. Suitable methods for surface activation include applying fluoride solution such as HF, NaF, $NH_4F$ or KF, preferably HF. This removes oxygen atoms from the surface and replaces them with surface-H groups.

The surface-H groups are then subsequently reacted to covalently bond the oligomeric moieties.

An advantage of this method is that the surface oxide layer is removed and thus in use, the surface—oligomeric moiety bond is more stable than a surface—O—oligomeric moiety bond, particularly in the presence of alkali and alkali earth metals. This means that oligomeric moiety remains bonded to the electrochemically active surface when in use, for example in a metal-ion battery.

Electrochemically Active Material

The electrochemically active material may be present in the form of a particle, a powder, a composite electrode layer or a thin film. The electrochemically active material may be at a surface of a negative electrode (hereinafter referred to as an "anode") in an electrochemical cell. The electrochemically active material may comprise silicon, carbon or mixtures thereof, such as a silicon-carbon composite or silicon. Preferably carbon is present. Preferably carbon is present in the form of natural or synthetic graphite, soft or hard carbon, preferably natural or synthetic graphite.

In the form of particles, the electrochemically active material has a higher surface area than a planar electrochemically active material, which may increase the efficiency of charge transfer in an electrochemical cell. Particulate material is also easier to handle and process and allows much greater flexibility in the design of high capacity electrodes. In the form of particles, the electrochemically active material may have a D50 diameter no less than 10 nm, preferably no less than 20 nm. In the form of particles, the electrochemically active material may have a D50 diameter of no more than 40 μm, preferably no more than 30 μm, more preferably no more than 25 μm. Preferably, the particles may have a D50 diameter from 0.05 to 30 μm. Alternatively, the particles may have a D50 diameter from 50 nm to 250 nm.

The particles of the invention may be formed into composite particles formed from a plurality of smaller primary particles. The particles making up a composite particle can include non-active material particles such as conductive elements (e.g. carbon-based elements) or components binding the composite particle together. The D50 of composite particles may be 0.5 to 25 μm.

If the particles are too small, they become more difficult to handle and process and to achieve a uniform dispersion within an electrode. Furthermore any native oxides formed on the electrochemically active surfaces will be a higher weight % of the total mass of active material, lowering overall capacity. If the particles are too large it may be difficult to make a strong dense composite electrode layer with a uniform thickness.

Electrochemically active particles may be in the form of spheroidal elements. Electrochemically active particles may be in the form of elongate elements, for example in the form of nanowires, fibres, tubes, flakes or ribbons. When in the form of such elongate elements the minor and major dimensions of the elongate elements should preferably also be within the minimum and maximum D50 diameters defined herein. For example elongate elements preferably have a minimum dimension of at least 10 nm, more preferably at least 20 nm. Preferably elongate elements have a maximum dimension of no more than 40 μm, more preferably no more than 30 μm.

Electrochemically active particles may be formed from a plurality of connected and/or branched elongate elements and/or spheroidal elements as described herein, arranged in a random or ordered manner to form a particulate structure containing the electrochemically active elongate and/or spheroidal elements.

Electrochemically active particles may be porous. "Porous" may be defined as comprising pores or voids, either at the surface and/or in the bulk of the particle. These are intra-particle pores or voids. The pore/void spaces may have average dimensions that are at least 10 nm. The pore/void spaces may have dimensions that are preferably no more than one tenth of the particle's D50 diameter. Porosity may be viewed under optical microscopy or scanning electron microscopy. In the case of porous active particles, the particles may have a porosity of at least 10%, preferably at least 20%, more preferably at least 25%. The porous particles may have a porosity less than 90%, preferably less than 85%.

Particle porosity may be calculated using mercury porosimetry as described in ASTM UOP578-11 (Automated Pore Volume and Pore Size Distribution of Porous Substances by Mercury Porosimetry, ASTM International, West Conshohocken, PA, 2011, www.astm.org). That method gives the porosity of a powder sample as a sum of inter-particle porosity (the spaces between particles in the powder) and intra-particle porosity (the pores within particles). The intra-particle porosity is the % porosity of the electrochemically active material of the invention and can be calculated from the total porosity.

Porosity of a composite electrode layer according to the invention may also be calculated. This porosity can be measured by image analysis of SEM images of cross-sections of the electrode. Image analysis software (e.g. open source ImageJ software) can distinguish pores within an SEM image. At least three cross-sections of the electrode should be taken and the % porosity quoted as an average of the value calculated for each cross-section.

The oligomer of the invention may bond to the surface inside a pore as well as on the outer surface of a porous particle.

The electrochemically active particles may be arranged on, formed on or attached to one or more substrates. The substrate(s) may be planar substrates or particulate substrates.

The invention may have a particular benefit when the electrochemically active material is in the form of porous particles, because pores tend to become blocked during the formation and distortion of a conventional SEI layer. With the invention, this can be avoided and thus the pores may be more available for wetting by the electrolyte and for access by the metal ions.

One type of particulate material suitable for use as the electrochemically active material is graphene sheets or nanographene platelets. Nanographene platelets are particles comprising of the order of 10 up to 100 aligned graphene layers, for example between 2 and 200 graphene layers, such as between 2 and 30 graphene layers.

For the avoidance of doubt, the term "particle diameter" as used herein refers to the equivalent spherical diameter (esd), i.e. the diameter of a sphere having the same volume as a given particle, wherein the particle volume is understood to include the volume of the intra-particle pores. The terms "D50" and "D50 particle diameter" as used herein refer to the volume-based median particle diameter, i.e. the diameter below which 50% by volume of the particle population is found.

Particle diameters and particle size distributions as reported herein can be determined by routine laser diffraction techniques. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer 2000 particle size analyzer from Malvern Instruments. The Malvern Mastersizer 2000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The electrochemically active material may be in the form of a powder. A powder is a plurality of discrete particles. A powder is flowable, that is, it is possible to pour a powder from one container to another. A powder may comprise particles, and/or composite particles.

A composite electrode layer comprises particles or a powder of the invention and at least one other component selected from (a) a binder, (b) a conductive additive and (c) particles of a further electrochemically active material. The composite electrode layer suitably has a thickness in the range of from 2 µm to 2 mm, preferably 5 µm to 1 mm, preferably 10 µm to 500 µm, preferably 10 µm to 200 µm, preferably 10 µm to 100 µm, preferably 10 µm to 50 µm.

Thin film form may be preferred for applications where a very small electrode area is desired, or for niche applications such as flexible batteries or high temperature or high rate operation. In the form of a thin film, the electrochemically active material may have a thickness of no less than 1 nm, preferably no less than 3 nm. In the form of a thin film, the electrochemically active material may have a thickness of no more than 10 µm, preferably no more than 5 µm, preferably no more than 1 µm.

An electrochemically active material may be defined as one that undergoes a change in composition when subjected to an applied potential. In the case of electrochemical cells and batteries, an electrochemically active material may undergo an intercalation process of metal ions (for example intercalation of lithium ions into graphite) or an alloying process (for example the formation of silicon-lithium alloys) or a conversion into a metal-ion-containing compound, during the charging of the cell for electrochemically active materials present in the negative electrode.

Electrode

The electrochemically active material of the invention may be used in a negative electrode. The negative electrode comprises (i) a current collector; and (ii) a composite electrode layer or a thin film as defined above.

The term current collector refers to any conductive substrate which is capable of carrying a current to and from the electrochemically active particles in the electrode composition. Examples of materials that can be used as the current collector include copper, aluminium, stainless steel, nickel, titanium sintered carbon and alloys or laminated foils comprising the aforementioned materials. Copper is a preferred material. The current collector is typically in the form of a foil or mesh having a thickness of between 3 to 500 µm. The electrochemically active particles of the invention may be applied to one or both surfaces of the current collector in the form of a composite electrode layer, alternatively, the thin film of the present invention may be applied one or both surfaces of the current collector.

Electrochemically active materials preferably constitute at least 50% by weight, more preferably at least 60% by weight of, more preferably at least 70 wt %, and optionally at least 80 wt %, for example at least 85 wt %, at least 90 wt %, or at least 95 wt % of the total weight of the composite electrode layer or thin film. The electrochemically active material may comprise the electrochemically active materials of the invention, and additional electrochemically active materials. The electrochemically active materials of the invention are preferably at least 1 wt % of the electrochemically active materials present in the composite electrode layer or thin film, more preferably at least 3 wt %, more preferable at least 5 wt %, more preferably at least 10 wt %, most preferably at least 20 wt % of the electrochemically active materials present in the composite electrode layer or thin film. The electrochemically active materials of the invention are preferably less than 90 wt % of the electrochemically active materials present in the composite electrode layer or thin film, more preferably less than 80 wt %, more preferably less than 50 wt % of the electrochemically active materials present in the composite electrode layer or thin film.

The composite electrode layer and thin film of the invention may optionally comprise a binder. A binder functions to adhere the composite electrode layer and thin film to a current collector and to maintain the integrity of the electrode composition. The binder is preferably a polymer-based binder. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR), and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total weight of the composite electrode layer or thin film.

The binder may optionally be present in combination with one or more additives that modify the properties of the binder, such as cross-linking accelerators, coupling agents and/or adhesive accelerators.

The composite electrode layer and thin film of the invention may optionally comprise one or more conductive additives. Preferred conductive additives are included so as to improve electrical conductivity between the electrochemically active components of the composite electrode layer or thin film and between the electrochemically active components of the composite electrode layer or thin film and a current collector. The conductive additives may suitably be selected from carbon black, carbon fibres, carbon nanotubes, acetylene black, ketjen black, denka black, graphene, nanographene platelets, reduced graphene oxide, metal fibres, metal powders and conductive metal oxides. Preferred conductive additives include carbon black, carbon fibres, graphene and carbon nanotubes.

The one or more conductive additives may suitably be present in a total amount of from at least 0.05 and no more than 20 wt %, preferably no more than 15 wt % and most preferably no more than 10 wt %, based on the total weight of the composite electrode layer or thin film.

The electrode of the invention may suitably be fabricated by combining particles or a powder of the electrochemically active of the invention with a solvent and optionally one or more viscosity modifying additives to form a slurry. The slurry is then cast onto the surface of a current collector and the solvent is removed, thereby forming a composite electrode layer on the surface of the current collector. Further steps, such as heat treatment to cure any binders and/or calendering/pressing of the composite electrode layer to densify it may be carried out as appropriate.

Alternatively, the slurry may be formed into a freestanding film or mat comprising the electrochemically active of the invention, for instance by casting the slurry onto a suitable casting template, removing the solvent and then removing the casting template. The resulting film or mat is in the form of a cohesive, freestanding mass which may then be bonded to a current collector by known processes.

A thin film of the present invention may be deposited on a current collector or bonded to a current collector by known processes.

Metal-Ion Batteries

The electrode of the invention may be used as the negative electrode (anode during discharge) of a metal-ion battery comprising an anode, the anode comprising an electrode as described previously, a cathode comprising a cathode active material capable of releasing and reabsorbing metal ions; and an electrolyte between the anode and the cathode.

The metal ions are preferably selected from lithium, sodium, potassium, calcium or magnesium. More preferably the rechargeable metal-ion battery of the invention is a lithium-ion battery, and the cathode active material is capable of releasing and lithium ions.

The cathode active material is preferably a metal oxide-based composite. Examples of suitable cathode active materials for a lithium-ion battery include $LiCoO_2$, $LiCo_{0.99}Al_{0.01}O_2$, $LiNiO_2$, $LiMnO_2$, $LiCo_{0.5}Ni_{0.5}O2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$, $LiNi_{0.33}Co_{0.33}Mn_{0.34}O_2$ and lithium metal phosphate olivines such as $LiFePO_4$. The cathode current collector is generally of a thickness of between 3 to 500 µm. Examples of materials that can be used as the cathode current collector include aluminium, stainless steel, nickel, titanium and sintered carbon.

The electrolyte is suitably a non-aqueous electrolyte containing a metal salt, e.g. a lithium salt for a lithium-ion battery, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Importantly, the electrochemically active material of the invention may mean that some electrolyte additives can be dispensed with. In particular, additives that modify the surface or modify the conventional SEI layer may no longer be necessary, because the oligomer may protect the surface.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, lithium iodide, $LiSiO_4$, $Li_2SiS_3$, $Li_4SiO_4$, $LiOH$ and $Li_3PO_4$.

The lithium salt for a lithium-ion battery is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$, $CF_3SO_3Li$ and lithium bis (oxalate)borate.

Where the electrolyte is a non-aqueous organic solution, the battery is preferably provided with a separator interposed between the anode and the cathode. The separator is typically formed of an insulating material having high ion permeability and high mechanical strength. The separator typically has a pore diameter of between 0.01 and 100 µm and a thickness of between 5 and 300 µm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

Method

The present invention relates to a method of modifying a surface of an electrochemically active material, the method comprising:

a. providing an electrochemically active material that comprises a surface, wherein the surface comprises silicon,
b. providing an oligomeric moiety selected from the group consisting of: Formula I, Formula II, Formula II, and mixtures thereof,
c. washing the surface with a fluoride solution, thereby forming an Si—H group on the surface,
d. applying the oligomeric moiety to the washed surface resulting from step (c).

Preferably the fluoride solution is selected from HF, NaF, NH$_4$F and KF, preferably HF.

The oligomer may be grafted to or from the surface. Grafting to the surface means that the first end group, second end group and linker group are assembled before attaching to the surface. Grafting from the surface means that the first end group is attached to the surface, then the linker group is attached to the first end group, then the second end group is attached to the other end of the linker group. The oligomer is grafted to the surface only at one end, i.e. only the first end group bonds to the surface oxide layer and the linker group and second end group extend away from the surface without bonding to it.

The oligomer may be attached to the surface in an ex situ process, i.e. the electrochemically active material and the oligomer are bonded prior to the electrochemically active material being used in the assembly of a component of a battery; such as when a particle or composite particle is treated prior to the assembly of a component of the battery.

The native surface will comprise an oxide layer. It is necessary to remove this layer before the oligomer is grafted to or from the surface. The surface oxide layer may be removed using a fluoride solution as discussed above.

Linker groups comprising amine groups can be prepared through an initial hydrosilylation reaction to bond a first end group to a hydride treated silicon surface, followed by reaction of functional groups on the first end group with the relevant linker group that includes an amine functionality.

Preferably, the reaction to bond the first end group to the surface silicon is initiated by hydrosilylation of a reactive alkyne.

A negative electrode may be formed from the electrochemically active material and at least one other component selected from (i) a binder, (ii) a conductive additive and (iii) particles of a further electrochemically active material.

The electrochemically active material of the invention is suitably used in a metal-ion secondary battery. The metal-ion battery may be formed by assembling a metal-ion battery comprising the negative electrode, a positive electrode and an electrolyte in between the negative electrode and the positive electrode. In this case, a potential difference (voltage) is applied across the cell and metal ions may begin intercalating with the electrochemically active material.

DETAILED DESCRIPTION OF DRAWINGS

FIG. 1A shows an electrochemically active material 1 with a surface 2 with an oligomeric moiety 5, 3, 6 covalently bonded once to the surface via the first end group 5. The second end group 6 of the oligomeric moiety is distal to the surface 2. The segment 3 is the portion of the oligomeric moiety between the first end group 5 and the second end group 6. The oligomeric moiety shown is one example that may be used in the present invention.

Figure 1B:
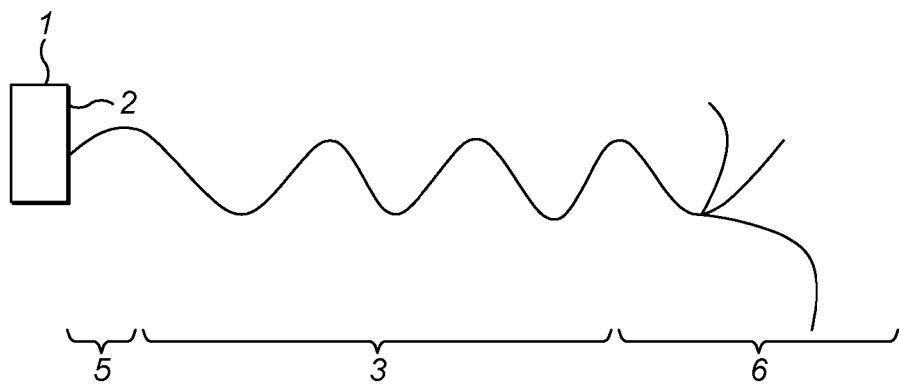
FIG. 1B shows a generalised schematic of FIG. 1A.

FIG. 1B shows a schematic of an electrochemically active material 1 with a surface 2 with an oligomeric moiety 5, 3, 6 covalently bonded once to the surface 2 via the first end group 5. The second end group 6 is distal to the surface 2.

Figure 2:
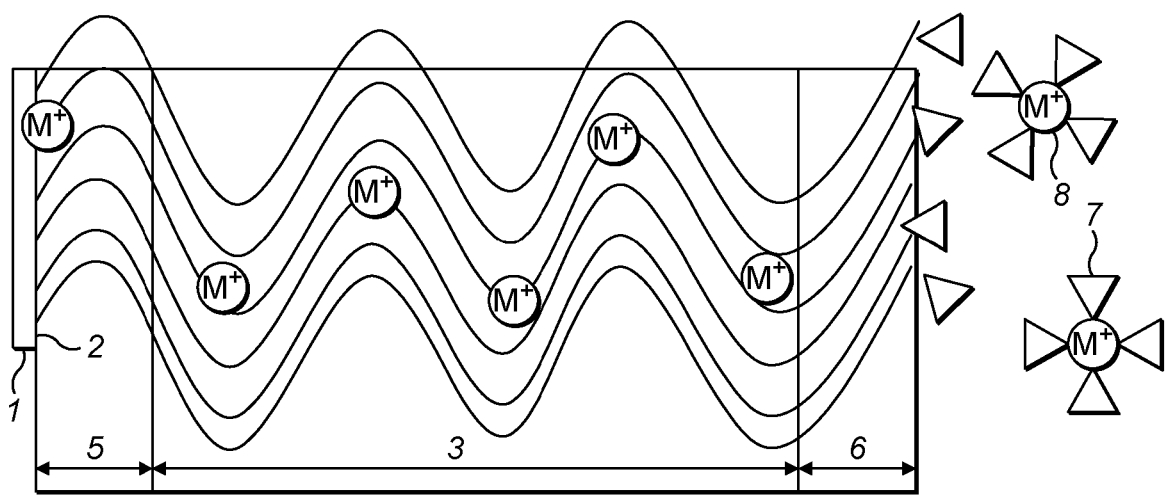
FIG. 2 shows a schematic of an array of oligomeric moieties each covalently bonded once to the surface of the electrochemically active material in the context of a metal-ion battery during discharging.

FIG. 2 is a schematic of an electrochemically active material 1 with a surface 2 comprising an array of oligomeric moieties each covalently bonded once to the surface 2. Adjacent oligomeric moieties in the array act as ion channels in a manner analogous to the ion channels found in biology. Metal ions 8 are solvated by either the supporting electrolyte molecules 7 or the oligomeric moieties. The metal ions may be M$^+$ ions such as lithium, sodium or potassium ions, or M$^{2+}$ ions, such as magnesium or calcium ions. The metals ions 8 can shuffle along the ion channels created by adjacent oligomeric moieties and can reach the surface 2. The supporting electrolyte molecules 7 may not move through the spaces between adjacent oligomeric moieties and may not reach the surface 2.

Figure 3:
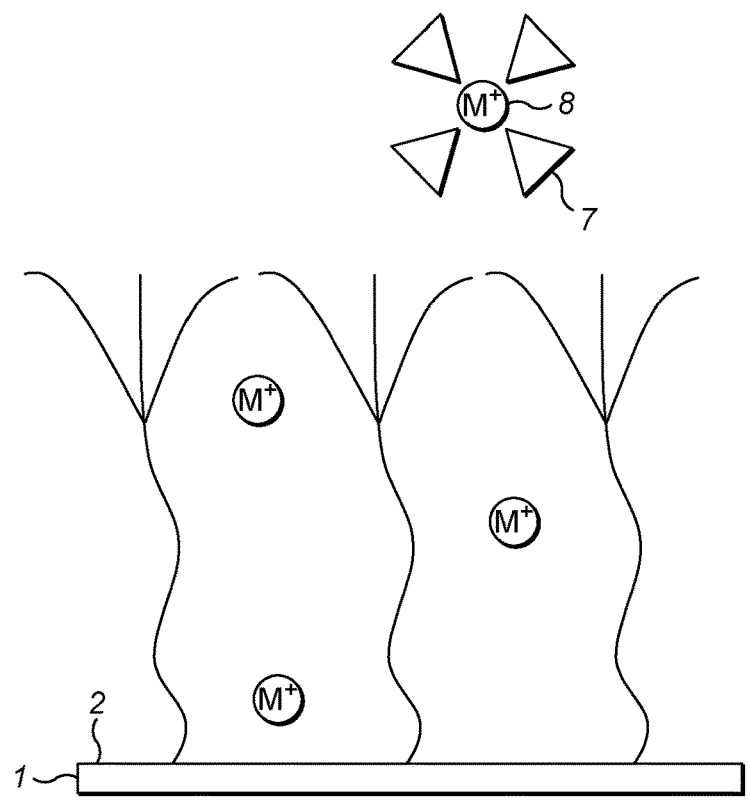
FIG. 3 shows another schematic of an array of oligomeric moieties each covalently bonded once to the surface of the electrochemically active material in the context of a metal-ion battery during discharging.

FIG. 3 is another schematic of an electrochemically active material 1 with a surface 2 comprising an array of oligomeric moieties each covalently bonded once to the surface 2. Adjacent oligomeric moieties in the array act as ion channels in a manner analogous to the ion channels found in biology. Metal ions 8 are solvated by either the supporting electrolyte molecules 7 or the oligomeric moieties. The metal ions may be M$^+$ ions such as lithium, sodium or potassium ions, or M$^{2+}$ ions, such as magnesium or calcium ions. The metals ions 8 can shuffle along the ion channels created by adjacent oligomeric moieties and can reach the surface 2. The second end groups are bulky, providing a steric hindrance barrier that prevents the supporting electrolyte molecules 7 from moving through the spaces between adjacent oligomeric moieties and thus preventing them from reaching the surface 2.

Figure 4:
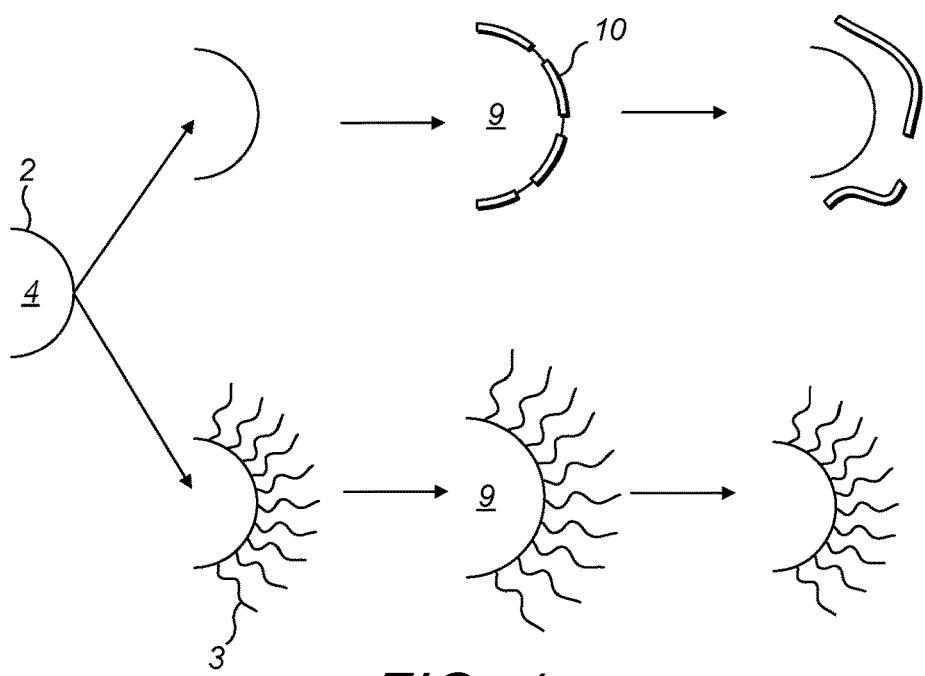
FIG. 4 shows a comparison of the effect of expansion of particulate electrochemically active material at a negative electrode when the electrochemically active material has a conventional SEI layer (upper line) and when the electrochemically active material comprises an array of oligomeric moieties each covalently bonded once to the surface, according to an embodiment the invention (lower line).

FIG. 4 shows a schematic of a particulate electrochemically active material 4 that comprises a surface 2. The upper line of the schematic shows an expanded particulate electrochemically active material 9 with a secondary electrolyte interphase (SEI) layer 10. As shown the SEI layer 10 has cracked due to the expansion of the particulate electrochemically active material. When the particulate electrochemically active material 4 contracts, the SEI layer flakes off the material. Cracked SEI layer may also accumulate at the anode surface, causing thickening of the anode. Further SEI layer will then be formed on the newly exposed surface 2.

In contrast, the lower line of the schematic shows a particulate electrochemically active material 4 with a surface 2 with an array of oligomeric moieties covalently bonded to the surface 2 and extending outwards from the surface substantially perpendicular to the surface 2. As particulate electrochemically active material expands 9 and then contracts, the oligomeric moieties remain covalently bond to the surface 2 and remain extended outward substantially perpendicular to the surface 2. This shows that the oligomeric moieties are unaffected by the expansion of the surface 2.

Figure 5:
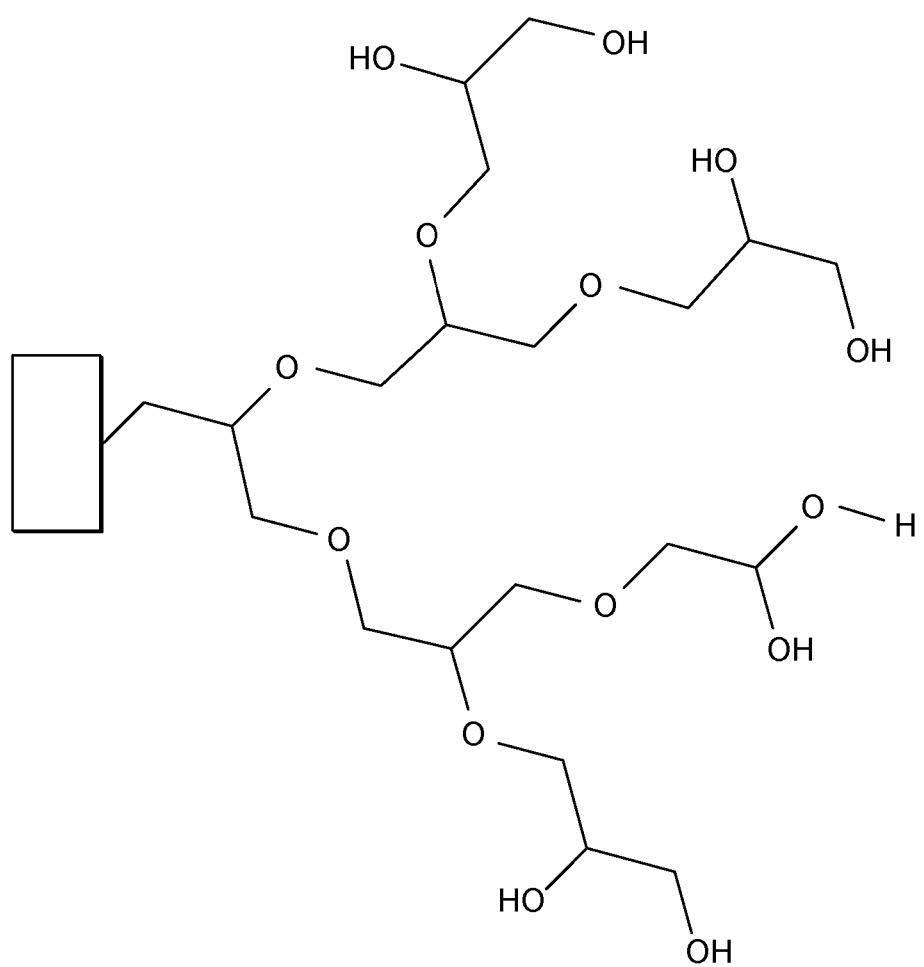
FIG. 5 shows a branched oligomeric moiety.

FIG. 5 shows an oligomeric moiety of the invention exhibiting hyperbranching. In other words, the oligomeric moiety branches at every repeat unit. Branched oligomeric moieties have a tree-like structure extending up from the surface of the electrochemically active material and may help to reduce or block access to the surface for supporting electrolyte molecules. When the surface is covalently bonded to an array of branched oligomeric moieties, a lower % of available surface oxide groups may be used compared to an array of linear oligomeric moieties. This may improve access for metal ions to the surface, thus improving intercalation of metal ions into the negative electrode and increasing electrode capacity.

EXAMPLES

Comparative Example 1

Porous silicon particles of were obtained by leaching 12 wt % Si—Al alloy particles. The porous silicon particles had a $D_{50}$ particle diameter of 20.6 μm and a porosity of 82%. The porous particles of Comparative Example 1 were used in test cells without any additional surface treatments.

Example 1

6 g of silicon particles in accordance with Comparative Example 1 were suspended in 90 mL water and 10 mL HF (concentration: 49 wt %) was added. The slurry is stirred for 10 min before diluting with a further 250 mL water. The Si was collected by filtration, washed with 50 mL water and dried in a vacuum oven. The Si was then re-suspended in 40 mL toluene and 0.5 g allyloxydiethylene methoxide was added. This mixture was heated to reflux overnight before cooling. The product was collected by filtration, washed with 50 mL acetone and dried in an oven overnight. The reaction scheme is shown below.

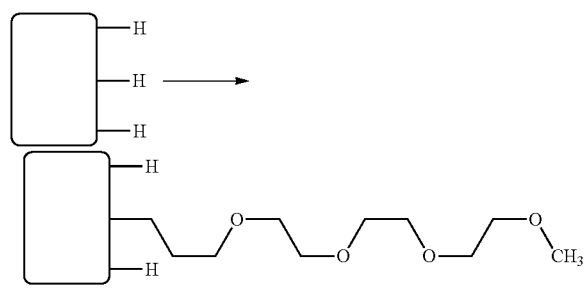

Example 2

6 g of silicon particles in accordance with Comparative Example 1 were suspended in 90 mL water and 10 mL HF (concentration: 49 wt %) was added. The slurry was stirred for 10 min before diluting with a further 250 mL water. The Si was collected by filtration, washed with 50 mL water and dried in a vacuum oven. The Si was then re-suspended in 40 mL toluene and 0.5 g 1H,1H-Perfluoro(2,5-dimethyl-3,6-dioxanonanoyl) acrylate was added. This mixture was heated to reflux overnight before cooling. The product was collected by filtration, washed with 50 mL acetone and dried in an oven overnight. The reaction scheme is shown below.

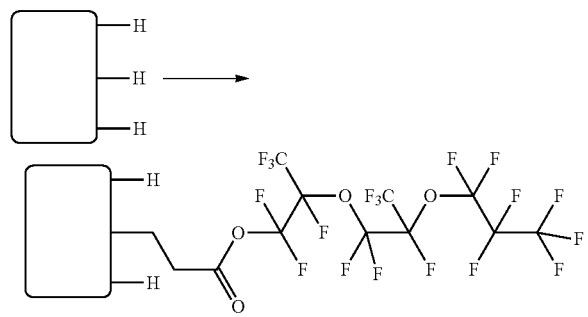

Example 3

6 g of silicon particles in accordance with Comparative Example 1 were suspended in 40 mL tetrahydrofuran (THF) and 2.3 g desired silane precursor agent. The mixture was purged with Ar for 10 min before the addition of 1 mL trimethylamine. The reaction was stirred for 6 hr before quenching with the addition of 5 mL isopropanol (IPA) followed by 5 mL water. The product was collected by filtration and washed with 50 mL water and 50 mL acetone. The resulting product is shown below.

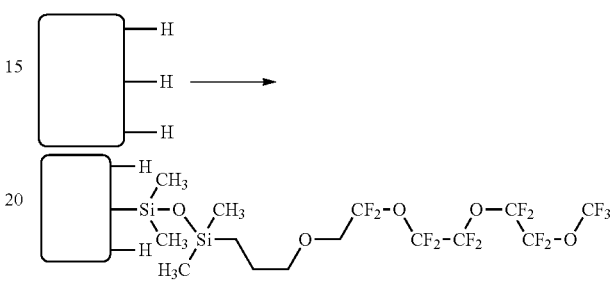

The BET surface area was 20.09 m²/g. The particle size distribution was $D_{10}$=0.55; $D_{50}$=4.47; $D_{90}$=39.3.

Example 4

50 g of silicon particles in accordance with Comparative Example 1 were placed in 300 mL water, and 16 mL HF dissolved in 100 mL water is added. The reaction was mechanically stirred for 10 min. 300 mL water was added and the Si retrieved by filtration. The Si was washed with 100 mL water and dried overnight in a vacuum oven at 60° C.

Option 1—Heat Treated Step (Example 4a):

6 g HF washed silicon in accordance with Example 4 was suspended in 40 mL toluene and 1.4 mL 3-[2-(2-Methoxyethoxy)ethoxy]-1-propene (sold as ENEA0180, from Gelest) was added. The reaction was stirred and heated to reflux under Ar overnight at 120° C. The reaction was cooled and filtered. The Si was washed with 50 mL acetone, before drying overnight in an oven at 70° C.

Option 2—Catalysed Treated Step (Example 4b): 6 g HF washed silicon is accordance with Example 4 was placed in 40 mL toluene and stirred in a RBF fitted with condenser and pressure equalised dropping funnel. 1.4 mL ENEA0180 (Gelest) was dissolved in 10 mL toluene and poured into the dropping funnel. 50 μL of the Karstedt stock solution (100 μL 10% Karstedt catalyst in toluene dissolved in 900 μL xylenes) was added, and the mixture heated to 60° C. under Ar with stirring. Once at 60° C., the ENEA0180 solution was drip fed into the reaction at a rate of 1 drop per second. The reaction was stirred overnight at 60° C. under Ar. The reaction was allowed to cool to room temperature, filtered, washed with 50 mL acetone and dried in a vacuum oven at 100° C. for 2 hr.

The resulting structure for both Example 4a and Example 4b is shown below.

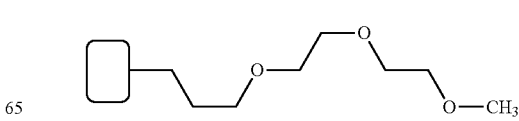

Process to Form Electrode and Coin Cell Comprising the Porous Particles

Test coin cells were made with negative electrodes comprising the porous silicon particles of Comparative Example 1 and Examples 4a to 4b as follows.

A dispersion of conductive carbons (a mixture of carbon black, carbon fibres and carbon nanotubes) in CMC binder was mixed in a Thinky™ mixer. Porous silicon particles were added to the mixture and mixed for 30 min in the Thinky™ mixer. SBR binder was then added to give a CMC:SBR ratio of 1:1 yielding a slurry with a weight ratio of porous particles:CMC/SBR:conductive carbon of 70:16:14. The slurry was further mixed by magnetic stirring for one hour, then was coated onto a 10 µm thick copper substrate (current collector) and dried to form a negative electrode comprising an active composite layer on the copper substrate. Full coin cells were made using circular negative electrodes of 0.8 cm radius cut from this electrode with a porous polyethylene separator and a lithium cobalt oxide positive electrode. The positive and negative electrodes were designed to form a balanced pair, such that the projected capacity ratio of the electrodes was around 1:1. An electrolyte comprising 1 M LiPF$_6$ in a 7:3 solution of EMC/FEC (ethylene methyl carbonate/fluoroethylene carbonate) containing 3 wt % vinylene carbonate was then added to the cell before sealing.

The coin cells were cycled as follows: A constant current was applied at a rate of C/25, to lithiate the anode, with a cut off voltage of 4.2 V. When the cut off was reached, a constant voltage of 4.2 V is applied until a cut off current of C/100 is reached. The cell was then rested for 1 hour in the lithiated state. The anode is then delithiated at a constant current of C/25 with a cut off voltage of 3.0 V. The cell was then rested for 1 hour. After this initial cycle, a constant current of C/2 was applied to lithiate the anode with a 4.2 V cut off voltage, followed by a 4.2 V constant voltage with a cut off current of C/40. The anode was then delithiated at a constant current of C/2 with a 3.0 V cut off. The cell was then rested for 5 minutes. This was then repeated for the desired number of cycles.

Example 5

The specific discharge capacity (mAh per gram of porous silicon particles) and discharge capacity retention (as a % of the initial discharge capacity) as a function of the charge/discharge cycle were measured of full coin cells made in accordance with the processes used to form electrode and coin cell comprising the porous particles as set out above. Coin cells using porous silicon particles of Comparative Example 1, Example 4a and Example 4b were compared. The results are shown in FIG. 6.

Figure 6:
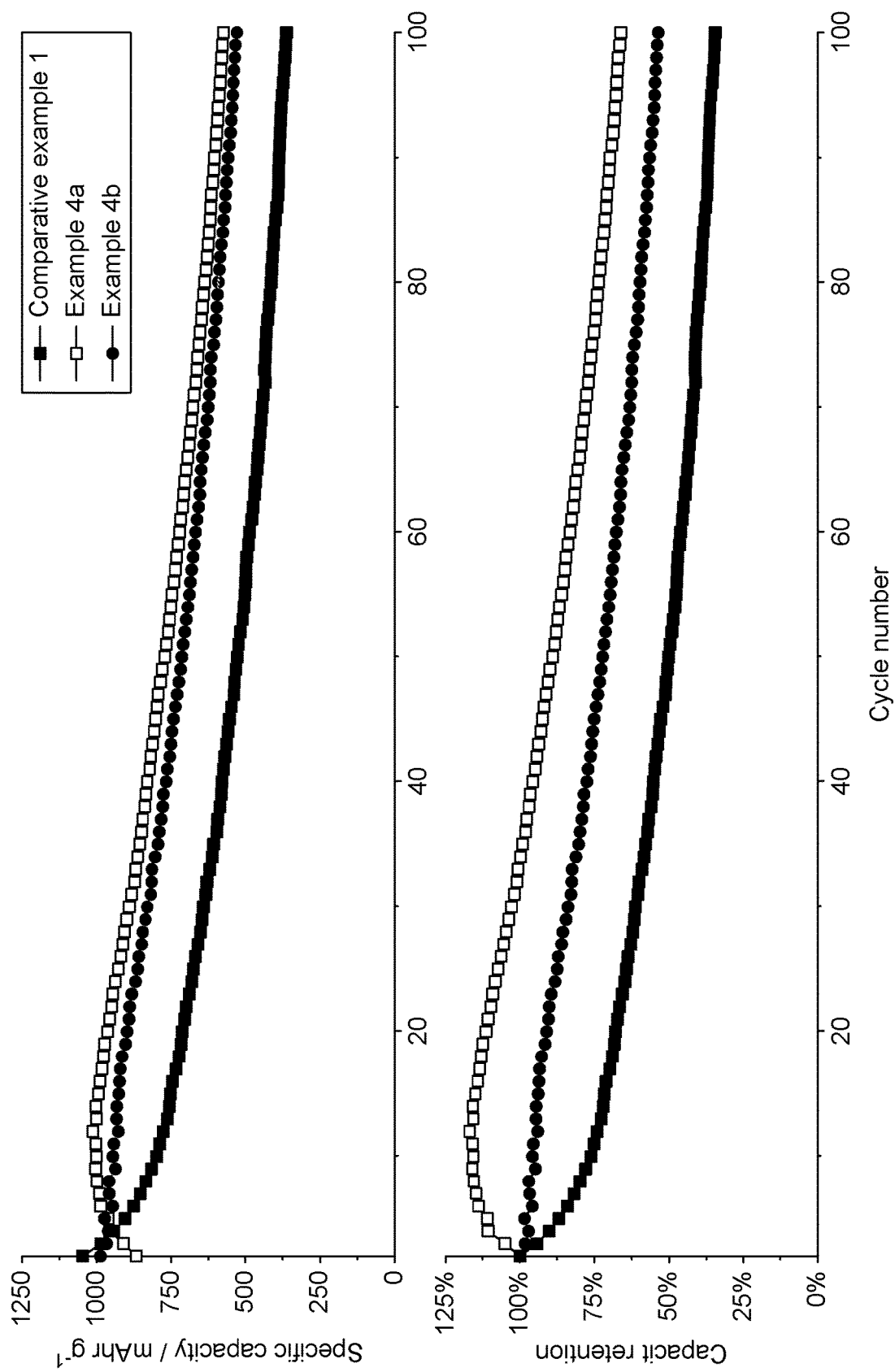
FIGS. 6, 7 and 8 show comparative cell cycle data.

FIG. 6 shows that the cell with the modified porous silicon particles in accordance with Example 4a and Example 4b have a higher specific capacity and a higher capacity retention than the cell with porous silicon particles in accordance with Comparative Example 1. This means that the electrochemically active material in accordance with the present invention results in an improved cell. Example 4a which used the heat treatment method to modify the silicon particles had a higher specific capacity and a higher capacity retention than the cell of Example 4b which used a catalysed method to modify the silicon particles.

Example 6

Hydride terminated silicon powder comprising aggregates of sub-micron sized particles (6.9 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Ethyl undecylenate (5 mL, Sigma-Aldrich) was added via syringe. AIBN (130 mg, Sigma, lot: STBD7210V) was added. The brown slurry was stirred at room temperature, and the slurry degassed using a syringe needle with argon for a minimum of 1 h.

The needle was removed from the suspension and the mixture was heated to 90° C. overnight (ca. 16 h). The flask was lifted out of the metal block and allowed to cool to room temperature. The slurry was filtered under Buchner vacuum filtration, washed with toluene, thf and acetone and then dried overnight at 100° C. in the vacuum oven.

The structure of the reagent is shown below. Covalent bonding between the reactant and the surface is achieved by a hydrosilylation reaction between the silicon hydride species at the silicon surface and the unsaturated double bond of the reagent to form an oligomeric moiety having a first end group that is an alkanediyl group.

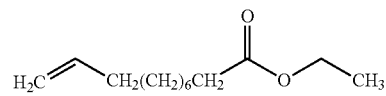

The BET surface area of the particles was 7 m$^2$/g. The particle size (µm) was: $D_{10}$=0.8; $D_{50}$=3.2; $D_{90}$=14.2.

Example 7

Hydride terminated silicon powder comprising aggregates of sub-micron sized particles (6.9 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Undecylenic acid (5 mL, Sigma-Aldrich, lot: STBC0014V) was added via syringe. AIBN (130 mg, Sigma, lot: STBD7210V) was added. The brown slurry was stirred at room temperature, and the slurry degassed using a syringe needle with argon for a minimum of 1 h.

The needle was removed from the suspension and the mixture was heated to 60-65° C. overnight (ca. 20 h). The flask was lifted out of the metal block and allowed to cool to room temperature. The slurry was filtered under Buchner vacuum filtration, washed with toluene, acetone, thf and acetone and then dried overnight at 100° C. in the vacuum oven.

The structure of the reactant is shown below. Covalent bonding between the reagent and the surface is achieved by a hydrosilylation reaction between the silicon hydride species at the silicon surface and the double bond of the reagent to form an oligomeric moiety having a first end group that is an alkanediyl group.

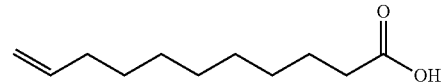

The particle size distribution was (μm) $D_{10}$=0.7; $D_{50}$=2.4; $D_{90}$=8.2.

Figure 7:
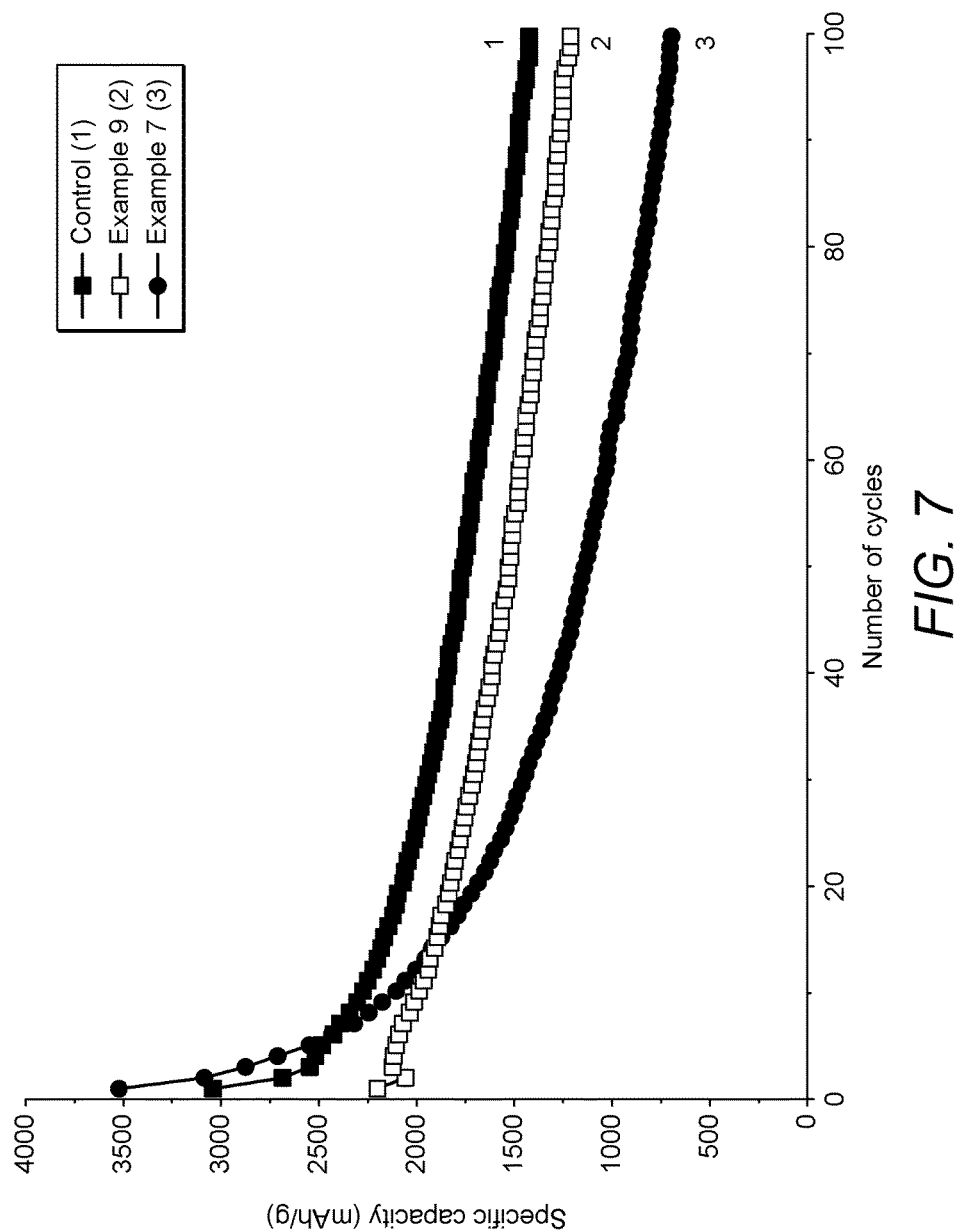

Cell cycling data are shown in FIG. 7.

Example 8

Hydride terminated silicon powder comprising aggregates of sub-micron sized particles (5 g) was carefully placed in an oven dried 50 mL 2 neck rbf with a stirrer bar. A clean dry air condenser was attached with an oil bubbler and the apparatus placed under argon. The apparatus was placed in a metal heating block on top of hotplate. Anhydrous toluene (20 mL, Sigma, lot: STBF8534V) was added via a syringe under argon. Ethyl propiolate (5 mL, Sigma, lot:) was added via syringe. AIBN (100 mg, Sigma, lot: STBD7210V) was added. The brown slurry was stirred at room temperature, and the slurry degassed using a syringe needle with argon for a minimum of 1 h.

The needle was removed from the suspension and the mixture was heated to 60-65° C. overnight (ca. 20 h). The flask was lifted out of the metal block and allowed to cool to room temperature. The slurry was filtered under Buchner vacuum filtration, washed with toluene, acetone, thf and acetone and then died overnight at 100° C. in the vacuum oven.

The structure of the reagent is shown below. Covalent bonding between the reagent and the surface is achieved by a hydrosilylation reaction between the silicon hydride species at the silicon surface and the unsaturated triple bond of the reagent to form an oligomeric moiety having a first end group that is an alkenediyl group.

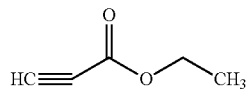

The BET surface area was 9 m$^2$/g. The particle size distribution was (μm) $D_{10}$=0.9; $D_{50}$=2.6; $D_{90}$=9.3.

Example 9

Hydride terminated Silicon powder comprising aggregates of sub-micron sized particles (7 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Propiolic acid (5 mL, Sigma-Aldrich, lot: STBF5891V) was added via syringe. AIBN (130 mg, Sigma, lot: STBD7210V) was added. The brown slurry was stirred at room temperature, and the slurry degassed using a syringe needle with argon for a minimum of 1 h.

The needle was removed from the suspension and the mixture was heated to 60-65° C. over the weekend (ca. 60 h). The flask was lifted out of the metal block and allowed to cool to room temperature. The slurry was filtered under Buchner vacuum filtration, washed with toluene, acetone, thf and acetone and then dried overnight at 100° C. in the vacuum oven.

The structure of the reagent is shown below. Covalent bonding between the reagent and the surface is achieved by a hydrosilylation reaction between the silicon hydride species at the silicon surface and the triple bond of the reagent to form an oligomeric moiety having a first end group that is an alkenediyl group.

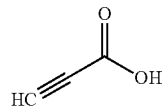

The particle size distribution was (μm) $D_{10}$=0.8; $D_{50}$=2.3; $D_{90}$=6.8. FIG. 7, line 2, shows cell cycling data for Example 9.

Example 10

Hydride terminated silicon powder comprising aggregates of sub-micron sized particles (ca. 6 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Propargyl alcohol (5 mL, Sigma, lot: STBD1580V) was added via syringe. AIBN (150 mg, Sigma, lot: STBD7210V) was added. The brown slurry was stirred at room temperature, and the slurry degassed using a syringe needle with argon for a minimum of 1 h.

The needle was removed from the suspension and the mixture was heated to 60-65° C. overnight (ca. 16 h). The flask was lifted out of the metal block and allowed to cool to room temperature. The slurry was filtered under Buchner vacuum filtration, washed with acetone, water, thf and acetone and then dried overnight at 100° C. in the vacuum oven.

The structure of the reagent is shown below. Covalent bonding between the reagent and the surface is achieved by a hydrosilylation reaction between the silicon hydride species at the silicon surface and the triple bond of the reagent to form an oligomeric moiety having a first end group that is an alkene diyl group.

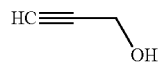

The BET surface area was 9 m$^2$/g. The particle size distribution was (μm) $D_{10}$=0.70; $D_{50}$=2.1; $D_{90}$=6.7.

Example 11

Hydride terminated silicon powder comprising aggregates of sub-micron sized particles (7.14 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. AIBN (150 mg, Sigma, lot: STBD7210V) was added. 3-buten-1-ol (5 mL, Sigma, lot: MKBJ6731V) was added via syringe. Finally, trimethylchlorosilane (0.5 mL—lot BCBQ46J0V) was added via a syringe to mop up excess water. The brown slurry was stirred gently at room temperature, and the slurry degassed using a syringe needle with argon for a minimum of 1 h.

The needle was removed from the suspension and the mixture was heated to 60-65° C. overnight (ca. 18 h). The flask was lifted out of the metal block and allowed to cool to room temperature. The slurry was filtered under Buchner vacuum filtration, washed with acetone (50 mL), thf (50 mL), water (50 mL) and acetone (20 mL) and then dried overnight at 100° C. in the vacuum oven.

The structure of the reagent is shown below. Covalent bonding between the reactant and the surface is achieved by a hydrosilylation reaction between the silicon hydride species at the silicon surface to form an oligomeric moiety having a first end group that is an alkanediyl group.

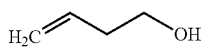

The BET surface area was 7 m$^2$/g. The particle size distribution (μm) was $D_{10}$=0.6; $D_{50}$=2.2; $D_{90}$=7.5.

Example 12

Hydride terminated silicon powder comprising aggregates of sub-micron sized particles (ca. 6.8 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Propargylamine (2.5 mL, Alfa, lot: U01C018) was added via syringe. AIBN (150 mg, Sigma, lot: STBD7210V) was added. The brown slurry was stirred at room temperature, and the slurry degassed using a syringe needle with argon for a minimum of 1 h.

The needle was removed from the suspension and the mixture was heated to 60-65° C. overnight (ca. 16 h). The flask was lifted out of the metal block and allowed to cool to room temperature. The slurry was filtered under Buchner vacuum filtration, washed with acetone, water, thf and acetone and then dried overnight at 100° C. in the vacuum oven.

The structure of the reagent is shown below. Covalent bonding between the reagent and the surface is achieved by a hydrosilylation reaction between the silicon hydride species at the silicon surface and the triple bond of the reagent to form an oligomeric moiety that has a first end group that is an alkenediyl group.

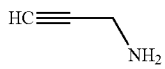

The BET surface area was 12 m$^2$/g. The particle size distribution was (μ) $D_{10}$=1.0; $D_{50}$=2.9; $D_{90}$=12.2.

Example 13

Hydride terminated silicon powder comprising aggregates of sub-micron sized particles (ca. 6.8 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Propargylamine (2.5 mL, Alfa, lot: U01C018) was added via syringe. H$_2$[PtCl$_6$] (150 mg, mmol, lot) in anhydrous MeOH (ca. 2.5 mL) was added to the mixture under argon. The brown slurry was stirred at room temperature, and the slurry degassed using a syringe needle with argon for a minimum of 1 h.

The needle was removed from the suspension and the mixture was heated to 60-65° C. overnight (ca. 16 h). The flask was lifted out of the metal block and allowed to cool to room temperature. The slurry was filtered under Buchner vacuum filtration, washed with acetone, water, thf and acetone and then dried overnight at 100° C. in the vacuum oven.

The BET surface area was 14 m$^2$/g. The particle size distribution was (μm) $D_{10}$=1.0; $D_{50}$=3.1; $D_{90}$=14.9.

The structure of the reagent is shown below. Covalent bonding between the reagent and the surface is achieved by a hydrosilylation reaction between the silicon hydride species at the silicon surface and the triple bond of the reagent to form an alkenyl intermediate having a double bond. This is hydrogenated to form an oligomeric moiety having a first end group that is an alkanediyl group.

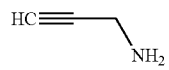

Example 14

Hydride terminated silicon powder comprising aggregates of sub-micron sized particles (6.8 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. Allyloxy(diethyleneoxide) (5 mL, Gelest Inc, lot: 5F-25141) was added via syringe. AIBN (150 mg, Sigma, lot: STBD7210V) was added. Finally, trimethylchlorosilane (0.5 mL) was added via a syringe to mop up excess water. The brown slurry was stirred gently at room temperature, and the slurry degassed using a syringe needle with argon for a minimum of 1 h.

The needle was removed from the suspension and the mixture was heated to 60-65° C. overnight (ca. 18 h). The flask was lifted out of the metal block and allowed to cool to room temperature. The slurry was filtered under Buchner vacuum filtration, washed with acetone (50 mL), thf (50 mL), water (50 mL) and acetone (20 mL) and then dried overnight at 100° C. in the vacuum oven.

The structure below was produced:

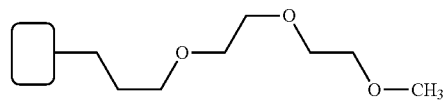

The BET surface area was measured as 7 m$^2$/g. The particle diameter size distribution was measured as $D_{10}$ 0.9 μm, $D_{50}$ 2.6 μm and $D_{90}$ 14.9 μm.

Figure 8:
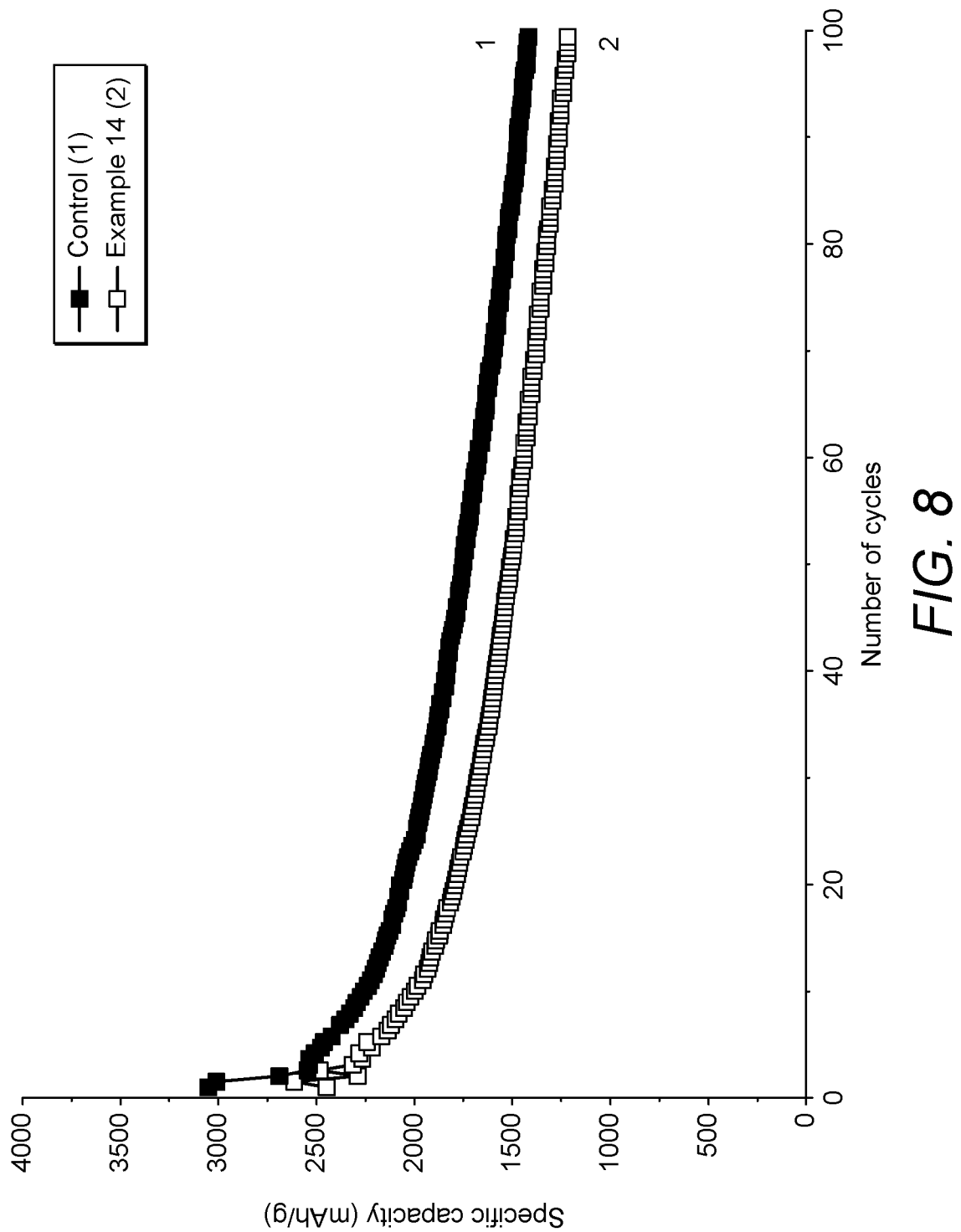

Cell cycling data are shown in FIG. 8, compared to a control sample.

The invention claimed is:
1. A method of modifying a surface of an electrochemically active material, the method comprising:
   providing an electrochemically active material having a surface having Si—H groups thereon;
   providing an oligomeric precursor having a terminal alkene or alkyne, the oligomeric precursor being of Formula Ia, Formula IIa, Formula IIIa, or mixtures thereof:

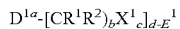   Formula Ia

   Formula IIa

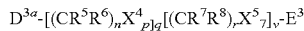   Formula IIIa in which:
   $D^{1a}$, $D^{2a}$ and $D^{3a}$ are each independently a fluorinated or non-fluorinated first end group selected from the group consisting of: $C_{2-4}$ alkenediyl, $C_{2-4}$ alkynediyl, $C_{2-4}$ alkenediyloxy, $C_{2-4}$ alkynediyloxy, $C_{3-4}$ alkenoyloxy, $C_{3-4}$ alkynoyloxy, $C_{2-4}$ alkenediyloxycarbonyl, and $C_{2-4}$ alkynediyloxycarbonyl;
   applying the oligomeric precursor to the surface having Si—H groups thereon, to hydrosilylate the Si—H groups to form an electrochemically active material comprising a surface, wherein a linear or branched oligomeric moiety is covalently bonded to the surface, wherein the linear or branched oligomeric moiety is selected from the group consisting of: Formula I, Formula II, Formula III, and mixtures thereof:

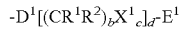   Formula I

   Formula II

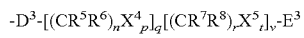   Formula III in which:
   $D^1$, $D^2$ and $D^3$ are each independently a fluorinated or non-fluorinated first end group selected from the group consisting of: $C_{2-4}$ alkanediyl, $C_{2-4}$ alkenediyl, $C_{2-4}$ alkanediyloxy, $C_{2-4}$ alkenediyloxy, $C_{3-4}$ alkanoyloxy, $C_{3-4}$ alkenoyloxy, $C_{2-4}$ alkanediyloxycarbonyl, and $C_{2-4}$ alkenediyloxycarbonyl;
   wherein:
   G is an aryl group selected from:

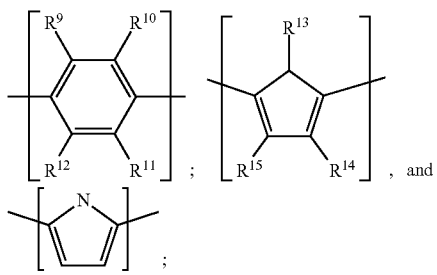

$R^1$, $R^2$, $R^3$, $R^4$, $R^7$ and $R^8$ are each independently selected from: H, F, fluorinated or non-fluorinated $C_{1-4}$ alkyl, fluorinated or non-fluorinated $C_{1-4}$ hydroxyalkyl, and phenyl;
   $R^5$ and $R^6$ are each independently selected from Formula IV:

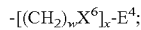   Formula IV $R^9$, $R^{10}$, $R^{11}$, $R^{12}$, $R^{13}$, $R^{14}$ and $R^{15}$ are each independently selected from: H, F, and $CH_3$;
   $X^1$, $X^2$, $X^3$, $X^4$, $X^5$ and $X^6$ are each independently selected from: O, PH, Se, and NH;
   $E^1$, $E^2$, $E^3$ and $E^4$ are each independently a second end group selected from the group consisting of:
      linear and branched, substituted or unsubstituted alkyl groups of the formula $-(CH_2)_y CH_3$, wherein $0 \leq y \leq 9$;
      linear and branched aryl or alkaryl groups of the formula $-(CH_2)_{aa} C_6 H_{ab} F_{ac}$, wherein $0 \leq aa \leq 6$, and the sum of ab and ac is 5;
      linear and branched fluorinated alkyl groups of the formula $-(CH_2)_{ad}(CF_2)_{ae} CF_3$, wherein $0 \leq ad \leq 6$ and $0 \leq ae \leq 9$;
      hydroxyl;
      hydrogen;
      $NR^{16}_2$, wherein each $R^{16}$ is independently selected from H and $C_{1-4}$ alkyl; nitro group; and
      ester groups $-COOR^{17}$ and $OCOR^{17}$ here $R^{17}$ is H or $C_{1-4}$ alkyl;
   a=0 or 1;
   b=from 2 to 6;
   c=0 or 1;
   d=from 0 to 16;
   e=0 or 1;
   f=from 2 to 6;
   g=0 or 1;
   h=from 1 to 16;
   j=from 2 to 6;
   k=0 or 1;
   l=from 0 to 15;
   h+1=from 2 to 16;
   m=0 or 1;
   n=from 2 to 6;
   p=0 or 1;
   q=from 1 to 16;
   r=from 2 to 6;
   t=0 or 1;
   v=0 to 15;
   q+v=from 2 to 16;
   w=2 to 6; and
   x=from 1 to 15.

2. The method of claim 1, wherein each of b, f, j, n and r is independently from 2 to 4.

3. The method of claim 1, wherein d is independently selected from 2 to 12.

4. The method of claim 1, wherein the linear or branched oligomeric moiety is of Formula II or Formula III, and the sum of h and l, and the sum of q and v are each independently from 2 to 12.

5. The method of claim 1, wherein each of $X^1$, $X^2$, $X^3$, $X^4$, $X^5$ and $X^6$ is independently selected from O, PH and Se.

6. The method of claim 1, wherein the groups $-[(CR^1R^2)_b X^1_c]_d-$, $-[(CR^3R^4)_j X^3_k]_l-$ and $-[(CR^7R^8)_r X^5_t]_v-$ of Formulae I, II and III, respectively, are each independently selected from the group consisting of: non-fluorinated linear and branched polyethylene oxide, non-fluorinated linear and branched polypropylene oxide, fluorinated linear or branched polyethylene oxide, fluorinated linear or branched polypropylene oxide, and mixtures thereof.

7. The method of claim 1, wherein the second end group $E^1$, $E^2$, $E^3$ and $E^4$ is each independently selected from the group consisting of:
   linear or branched alkyl groups of the formula $-(CH_2)_y CH_3$, wherein $0 \leq y \leq 9$;

linear and branched aryl and alkaryl groups of the formula —$(CH_2)_{aa}C_6H_{ab}F_{ac}$, wherein $0 \leq aa \leq 6$, and the sum of ab and ac is 5;

linear and branched fluorinated alkyl groups of the formula —$(CH_2)_{ad}(CF_2)_{ae}CF_3$, wherein $0 \leq ad \leq 6$ and $0 \leq ae \leq 9$;

hydroxyl; and hydrogen.

8. The method of claim 1, wherein each of $D^1$, $D^2$ and $D^3$ is independently selected from the group consisting of diyls derived from fluorinated and non-fluorinated $C_{1-4}$ alkyl, fluorinated and non-fluorinated $C_{1-4}$ ester, fluorinated and non-fluorinated $C_{1-4}$ ether; and mixtures thereof.

9. The method of claim 1, wherein each linear or branched oligomeric moiety has only one covalent bond to the surface.

10. The method of claim 1, wherein an array of the linear or branched oligomeric moieties is covalently bonded to the surface, wherein each linear or branched oligomeric moiety in the array is independently selected from the group consisting of Formula I, Formula II, Formula III, and mixtures thereof.

11. The method of claim 1, wherein the linear or branched oligomeric moiety is of Formula III, and each w is independently 2 or 3 and each x is independently 2 to 6.

12. The method of claim 1, wherein b=from 2 to 4;
f=from 2 to 4;
j=from 2 to 4;
n=from 2 to 4;
r=from 2 to 4;
d is independently selected from 2 to 12;
h+l=from 2 to 12;
q+v=from 2 to 12; and
each of $X^1$, $X^2$, $X^3$, $X^4$, $X^5$ and $X^6$ are independently selected from O, PH and Se.

13. The method of claim 1, wherein the linear or branched oligomeric moiety is of Formula I.

14. The method of claim 1, wherein the linear or branched oligomeric moiety is of Formula II.

15. The method of claim 1, wherein the linear or branched oligomeric moiety is of Formula III.

16. The method of claim 1, wherein the electrochemically active material is in the form of one or more particles, the one or more particles of the first electrochemically active material are silicon particles or silicon-carbon composite particles, the method further comprising forming the electrochemically active material into a composite electrode layer comprising at least one other component selected from a binder and a conductive additive.

17. The method of claim 1, wherein the Si—H groups are formed by washing the surface with a fluoride solution.

18. The method of claim 17, wherein the fluoride solution is selected from HF, NaF, NH$_4$F and KF.

19. The method of claim 1, further comprising forming a negative electrode from the electrochemically active material and a current collector.

20. The method of claim 19, further comprising assembling a metal-ion battery comprising the negative electrode, a positive electrode and an electrolyte in between the negative electrode and the positive electrode.

* * * * *